(12) United States Patent
Zhou et al.

(10) Patent No.: US 11,258,567 B2
(45) Date of Patent: Feb. 22, 2022

(54) METHOD AND APPARATUS FOR SENDING SIGNALING, METHOD AND APPARATUS FOR SENDING REFERENCE SIGNAL, AND SYSTEM

(71) Applicant: BEIJING XIAOMI MOBILE SOFTWARE CO., LTD., Beijing (CN)

(72) Inventors: Juejia Zhou, Beijing (CN); Wei Hong, Beijing (CN); Ming Zhang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 489 days.

(21) Appl. No.: 16/198,074

(22) Filed: Nov. 21, 2018

(65) Prior Publication Data

US 2019/0097777 A1 Mar. 28, 2019

Related U.S. Application Data

(63) Continuation of application No. PCT/CN2016/094360, filed on Aug. 10, 2016.

(30) Foreign Application Priority Data

May 23, 2016 (CN) .......................... 201610344922.3

(51) Int. Cl.
*H04L 5/00* (2006.01)
*H04W 48/16* (2009.01)
*H04B 7/0417* (2017.01)
*H04W 72/04* (2009.01)
(Continued)

(52) U.S. Cl.
CPC ......... *H04L 5/0053* (2013.01); *H04B 7/0417* (2013.01); *H04L 5/0048* (2013.01); *H04W 48/16* (2013.01); *H04W 72/0413* (2013.01); *H04W 72/085* (2013.01);
(Continued)

(58) Field of Classification Search
CPC ............ H04W 48/16; H04W 72/0413; H04W 72/085
See application file for complete search history.

(56) References Cited

U.S. PATENT DOCUMENTS

2015/0173091 A1* 6/2015 Ratasuk ................ H04W 16/10
455/452.2
2017/0230869 A1* 8/2017 Kubota ............. H04W 36/0005

FOREIGN PATENT DOCUMENTS

| CN | 1200637 A | 12/1998 |
|---|---|---|
| CN | 1265253 A | 8/2000 |
| CN | 101267675 A | 9/2008 |

(Continued)

OTHER PUBLICATIONS

U.S. Appl. No. 62/293,761 specification for US-20170230869-A1, Kubota et al. (Year: 2016).*

(Continued)

*Primary Examiner* — Kodzovi Acolatse
*Assistant Examiner* — Farhad Ali
(74) *Attorney, Agent, or Firm* — Syncoda LLC; Feng Ma

(57) ABSTRACT

A method for sending signaling, a method and apparatus for sending a reference signal, and a system include: detecting, with an access network equipment, whether communications of a terminal device in a first frequency band satisfy a predetermined condition; and sending a reference signal in a second frequency band by the terminal device after receiving a predetermined instruction.

8 Claims, 17 Drawing Sheets

(51) Int. Cl.
*H04W 72/08* (2009.01)
*H04B 7/06* (2006.01)

(52) U.S. Cl.
CPC ......... *H04B 7/063* (2013.01); *H04W 72/0453* (2013.01); *Y02D 30/70* (2020.08)

(56) References Cited

FOREIGN PATENT DOCUMENTS

| CN | 101500264 A | 8/2009 |
|---|---|---|
| CN | 102332970 A | 1/2012 |
| CN | 103037394 U | 4/2013 |
| CN | 103384398 A | 11/2013 |
| CN | 103781163 A | 5/2014 |
| CN | 105284066 A | 1/2016 |
| JP | 2012507912 A | 3/2012 |
| JP | 2013516918 A | 5/2013 |
| JP | 2016504885 A | 2/2016 |
| WO | 2016073039 A1 | 5/2016 |

OTHER PUBLICATIONS

International Search Report in international application No. PCT/CN2016/101078, dated Feb. 16, 2017.
1st Office Action in CN201610344922.3 dated Jul. 19, 2018.
Yang, Yafei, "Key technologies for 5G communication," presentation on Oct. 13, 2015.
Preliminary Rejection in KR 10-2016-7028041 dated Apr. 18, 2018.
Ericsson, ST-Ericsson, Further Discussions on SRS Enhancements; San Francisco, USA, Feb. 22-26, 2010.
Alcatel-Lucent Shanghai Bell, Alcatel-Lucent, "Configuration for Dynamic Aperiodic SRS Triggering," Jacksonville, USA, Nov. 15-19, 2010.
Motorola, "Multi-Antenna Support in UL PUSCH/PUCCH/PRACH/SRS Transmission," San Francisco, USA, May 4-8, 2009.
Notice of Rejection in JP 2016-561812 dated Jul. 26, 2017.

* cited by examiner

METHOD AND APPARATUS FOR SENDING SIGNALING, METHOD AND APPARATUS FOR SENDING REFERENCE SIGNAL, AND SYSTEM

CROSS-REFERENCE TO RELATED APPLICATIONS

This application is a continuation of, and claims priority to, PCT/CN2016/094360 filed on Aug. 10, 2016, which claims priority to Chinese Patent Application No. 201610344922.3 filed May 23, 2016. The disclosures of these applications are incorporated herein by reference in their entirety.

BACKGROUND

A Reference Signal (RS) is a signal provided by a sending terminal to a receiving terminal for channel evaluation or channel sounding.

In a Long-Term Evolution (LTE) system, a downlink reference signal is usually sent by an evolutional Node B (eNB or e-NodeB) in a service range, and a User Equipment (UE) located in the service range measures the downlink reference signal, and performs a random-access process or a data sending-receiving process according to the measuring result.

SUMMARY

The present disclosure relates to the field of communications, and more specifically, to a method and apparatus for sending signaling, a method and apparatus for sending a reference signal, and a system.

Various embodiments of the present disclosure provide a method for sending signaling, a method and apparatus for sending a reference signal, and a system.

According to a first aspect of embodiments of the present disclosure, there is provided a method for sending signaling, including:

detecting, by a first access network equipment, whether communications of a terminal device in a first frequency band satisfy a predetermined condition;

sending, by the first access network equipment, predetermined signaling to the terminal device when the communications in the first frequency band satisfy the predetermined condition, the predetermined signaling being configured for instructing the terminal device to send a reference signal in a second frequency band;

wherein the first frequency band is different from the second frequency band.

In some embodiments, the predetermined condition includes at least one of the following conditions:

a signal intensity of a first signal being greater than a preset intensity;

a receiving power of the first signal being greater than a preset power;

a receiving quality of the first signal being greater than a preset quality; and an error rate of the first signal being less than a preset value;

wherein the first signal is a signal sent by the terminal device in the first frequency band.

In some embodiments, the predetermined condition includes:

a distance between a first geographical position of the terminal device when using the first frequency band to communicate and a second geographical position of a predetermined access network equipment being less than a preset threshold;

or, a first geographical position of the terminal device when using the first frequency band to communicate belonging to a predetermined region, and the predetermined region being a region determined according to a predetermined access network equipment;

wherein the predetermined access network equipment is an access network equipment that supports the second frequency band.

In some embodiments, the predetermined condition includes:

an antenna number of multiple-input multiple-output MIMO antennas used when receiving a first signal exceeding a preset number;

or, an antenna position of multiple-input multiple-output MIMO antennas used when receiving a first signal complying with a preset position;

or, an antenna number of multiple-input multiple-output MIMO antennas used when receiving a first signal exceeding a preset number, and an antenna position of the multiple-input multiple-output MIMO antennas used when receiving a first signal complying with a preset position;

wherein the first signal is a signal send by the terminal device in the first frequency band, and the antenna position refers to a position of the used MIMO antennas relative to an MIMO antenna array.

In some embodiments, the predetermined condition includes:

a signal parameter of a signal sent by the terminal device in the first frequency band and received by a second access network equipment complying with a first condition;

or, a signal parameter of a signal sent by the terminal device in the first frequency band and received by a second access network equipment complying with a second condition, and a signal parameter of a signal sent by the terminal device in the first frequency band and received by the first access network equipment complying with a third condition;

wherein the signal parameter includes: at least one of a signal intensity, a signal power, a signal quality, and a signal error rate.

In some embodiments, the predetermined condition includes:

a signal receiving intensity of a first positioning signal received by the terminal device being less than a first intensity;

or, a signal receiving intensity of a first positioning signal received by the terminal device being less than a first intensity, and a signal receiving intensity of a second positioning signal received by the first access network equipment being less than a second intensity;

or, a difference between a signal receiving intensity of a first positioning signal received by the terminal device and a signal receiving intensity of a second positioning signal received by the first access network equipment being less than a preset difference;

wherein the first positioning signal is a positioning signal received by the terminal device when using the first frequency band to communicate.

In some embodiments, an upper frequency limit of the first frequency band is less than a lower frequency limit of the second frequency band.

In some embodiments, a number of the second frequency band is n, and each of the second frequency band is corresponding to the predetermined condition thereof.

In some embodiments, the reference signal includes at least one of the following reference signals:

a specific reference signal for the terminal device, a demodulation reference signal DMRS, a sounding reference signal SRS, and a channel state information reference signal CSI-RS.

According to a second aspect of the embodiments of the present disclosure, there is provided a method for sending a reference signal, including:

communicating, by a terminal device, with an access network equipment in a first frequency band;

receiving, by the terminal device, a predetermined instruction sent by the access network equipment, the predetermined instruction being sent by the access network equipment when communications in the first frequency band satisfy a predetermined condition; and sending, by the terminal device, a reference signal in a second frequency band;

wherein the first frequency band is different from the second frequency band.

In some embodiments, an upper frequency limit of the first frequency band is less than a lower frequency limit of the second frequency band.

In some embodiments, a number of the second frequency band is n, and each of the second frequency band is corresponding to the predetermined condition thereof.

In some embodiments, the reference signal includes at least one of the following reference signals:

a specific reference signal for the terminal device, a demodulation reference signal DMRS, a sounding reference signal SRS, and a channel state information reference signal CSI-RS.

According to a third aspect of the embodiments of the present disclosure, there is provided a method for sending a reference signal, including:

communicating, by a terminal device, with a first access network equipment in a first frequency band;

detecting, by the terminal device, whether communications in the first frequency band satisfy a predetermined condition; and sending, by the terminal device, a reference signal in a second frequency band when the communications in the first frequency band satisfy the predetermined condition;

wherein the first frequency band is different from the second frequency band.

In some embodiments, the predetermined condition includes at least one of the following conditions:

a signal intensity of a second signal being greater than a preset intensity;

a receiving power of the second signal being greater than a preset power;

a receiving quality of the second signal being greater than a preset quality; and an error rate of the second signal being less than a preset value;

wherein the second signal is a signal sent by the first access network equipment in the first frequency band.

In some embodiments, the predetermined condition includes:

a distance between a first geographical position of the terminal device when using the first frequency band to communicate and a second geographical position of a predetermined access network equipment being less than a preset threshold;

or, a first geographical position of the terminal device when using the first frequency band to communicate belonging to a predetermined region, and the predetermined region being a region determined according to a predetermined access network equipment;

wherein the predetermined access network equipment is an access network equipment that supports the second frequency band.

In some embodiments, the predetermined condition includes:

an antenna number of multiple-input multiple-output MIMO antennas used by the terminal device when sending a signal in the first frequency band exceeding a preset number;

or, an antenna position of multiple-input multiple-output MIMO antennas used by the terminal device when sending a signal in the first frequency band complying with a preset position;

or, an antenna number of multiple-input multiple-output MIMO antennas used by the terminal device when sending a signal in the first frequency band exceeding a preset number, and an antenna position of multiple-input multiple-output MIMO antennas used by the terminal device when sending the signal in the first frequency band complying with a preset position;

wherein the antenna position refers to a position of the used MIMO antennas relative to an MIMO antenna array.

In some embodiments, the predetermined condition includes:

a signal receiving intensity of a first positioning signal received by the terminal device being less than a first intensity;

or, a signal receiving intensity of a first positioning signal received by the terminal device being less than the first intensity, and a signal receiving intensity of a second positioning signal received by the first access network equipment being less than a second intensity;

or, a difference between a signal receiving intensity of a first positioning signal received by the terminal device and a signal receiving intensity of a second positioning signal received by the first access network equipment being less than a preset difference;

wherein the first positioning signal is a positioning signal received by the terminal device when using the first frequency band to communicate.

In some embodiments, an upper frequency limit of the first frequency band is less than a lower frequency limit of the second frequency band.

In some embodiments, a number of the second frequency band is n, and each of the second frequency band is corresponding to the predetermined condition thereof.

According to a fourth aspect of the present disclosure, there is provided an apparatus for sending signaling, including:

a processing module configured to detect whether communications of a terminal device in a first frequency band satisfy a predetermined condition; and a sending module configured to send predetermined signaling to the terminal device when the communications in the first frequency band satisfy the predetermined condition, the predetermined signaling being configured for instructing the terminal device to send a reference signal in a second frequency band;

wherein the first frequency band is different from the second frequency band.

In some embodiments, the predetermined condition includes at least one of the following conditions:

a signal intensity of a first signal being greater than a preset intensity;

a receiving power of the first signal being greater than a preset power;

a receiving quality of the first signal being greater than a preset quality; and a error rate of the first signal being less than a preset value;

wherein the first signal is a signal sent by the terminal device in the first frequency band.

In some embodiments, the predetermined condition includes:

a distance between a first geographical position of the terminal device when using the first frequency band to communicate and a second geographical position of a predetermined access network equipment being less than a preset threshold;

or, a first geographical position of the terminal device when using the first frequency band to communicate belonging to a predetermined region, and the predetermined region being a region determined according to a predetermined access network equipment;

wherein the predetermined access network equipment is an access network equipment that supports the second frequency band.

In some embodiments, the predetermined condition includes:

an antenna number of multiple-input multiple-output MIMO antennas used when receiving a first signal exceeding a preset number;

or, an antenna position of multiple-input multiple-output MIMO antennas used when receiving a first signal complying with a preset position;

or, an antenna number of multiple-input multiple-output MIMO antennas used when receiving a first signal exceeding a preset number, and an antenna position of the multiple-input multiple-output MIMO antennas used when receiving a first signal complying with a preset position;

wherein the first signal is a signal send by the terminal device in the first frequency band, and the antenna position refers to a position of the used MIMO antennas relative to an MIMO antenna array.

In some embodiments, the predetermined condition includes:

a signal parameter of a signal sent by the terminal device in the first frequency band and received by a second access network equipment complying with a first condition;

or, a signal parameter of a signal sent by the terminal device in the first frequency band and received by the second access network equipment complying with a second condition, and a signal parameter of a signal sent by the terminal device in the first frequency band and received by the apparatus for sending signaling complying with a third condition;

wherein the signal parameter includes: at least one of a signal intensity, a signal power, a signal quality, and a signal error rate.

In some embodiments, the predetermined condition includes:

a signal receiving intensity of a first positioning signal received by the terminal device being less than a first intensity;

or, a signal receiving intensity of a first positioning signal received by the terminal device being less than the first intensity, and a signal receiving intensity of a second positioning signal received by the apparatus for sending signaling being less than a second intensity;

or, a difference between a signal receiving intensity of a first positioning signal received by the terminal device and a signal receiving intensity of a second positioning signal received by the apparatus for sending signaling being less than a preset difference;

wherein the first positioning signal is a positioning signal received by the terminal device when using the first frequency band to communicate.

In some embodiments, an upper frequency limit of the first frequency band is less than a lower frequency limit of the second frequency band.

In some embodiments, a number of the second frequency band is n, and each of the second frequency band is corresponding to the predetermined condition thereof.

In some embodiments, the reference signal includes at least one of the following reference signals:

a specific reference signal for the terminal device, a demodulation reference signal DMRS, a sounding reference signal SRS, and a channel state information reference signal CSI-RS.

According to a fifth aspect of the present disclosure, there is provided an apparatus for sending a reference signal, including:

a processing module configured to communicate with an access network equipment in a first frequency band;

a receiving module configured to receive a predetermined instruction sent by the access network equipment, the predetermined instruction being sent by the access network equipment when communications in the first frequency band satisfy a predetermined condition; and a sending module configured to send a reference signal in a second frequency band;

wherein the first frequency band is different from the second frequency band.

In some embodiments, an upper frequency limit of the first frequency band is less than a lower frequency limit of the second frequency band.

In some embodiments, a number of the second frequency band is n, and each of the second frequency band is corresponding to the predetermined condition thereof.

In some embodiments, the reference signal includes at least one of the following reference signals:

a specific reference signal for the terminal device, a demodulation reference signal DMRS, a sounding reference signal SRS, and a channel state information reference signal CSI-RS.

According to a sixth aspect of the present disclosure, there is provided an apparatus for sending a reference signal, including:

a processing module configured to communicate with a first access network equipment in a first frequency band;

the processing module being configured to detect whether communications in the first frequency band satisfy a predetermined condition; and a sending module configured to send a reference signal in a second frequency band when the communications in the first frequency band satisfy the predetermined condition;

wherein the first frequency band is different from the second frequency band.

In some embodiments, the predetermined condition includes at least one of the following conditions:

a signal intensity of a second signal being greater than a preset intensity;

a receiving power of the second signal being greater than a preset power;

a receiving quality of the second signal being greater than a preset quality; and an error rate of the second signal being less than a preset value;

wherein the second signal is a signal sent by the first access network equipment in the first frequency band.

In some embodiments, the predetermined condition includes:

a distance between a first geographical position of the apparatus for sending a reference signal when using the first frequency band to communicate and a second geographical position of a predetermined access network equipment being less than a preset threshold;

or, a first geographical position of the apparatus for sending a reference signal when using the first frequency band to communicate belonging to a predetermined region, and the predetermined region being a region determined according to a predetermined access network equipment;

wherein the predetermined access network equipment is an access network equipment that supports the second frequency band.

In some embodiments, the predetermined condition includes:

an antenna number of multiple-input multiple-output MIMO antennas used by the apparatus for sending a reference signal when sending a signal in the first frequency band exceeding a preset number;

or, an antenna position of multiple-input multiple-output MIMO antennas used by the apparatus for sending a reference signal when sending a signal in the first frequency band complying with a preset position;

or, an antenna number of multiple-input multiple-output MIMO antennas used by the apparatus for sending a reference signal when sending a signal in the first frequency band exceeding a preset number, and an antenna position of the multiple-input multiple-output MIMO antennas used by the apparatus for sending a reference signal when sending a signal in the first frequency band complying with a preset position;

wherein the antenna position refers to a position of the used MIMO antennas relative to an MIMO antenna array.

In some embodiments, the predetermined condition includes:

a signal receiving intensity of a first positioning signal received by the apparatus for sending a reference signal being less than a first intensity;

or, a signal receiving intensity of a first positioning signal received by the apparatus for sending a reference signal being less than the first intensity, and a signal receiving intensity of a second positioning signal received by the first access network equipment being less than a second intensity;

or, a difference between a signal receiving intensity of a first positioning signal received by the apparatus for sending a reference signal and a signal receiving intensity of a second positioning signal received by the first access network equipment being less than a preset difference;

wherein the first positioning signal is a positioning signal received by the apparatus for sending a reference signal when using the first frequency band to communicate.

In some embodiments, an upper frequency limit of the first frequency band is less than a lower frequency limit of the second frequency band.

In some embodiments, a number of the second frequency band is n, and each of the second frequency band is corresponding to the predetermined condition thereof.

According to a seventh aspect of the present disclosure, there is provided an access network equipment, including:

a processor; and a memory for storing instructions executable by the processor;

wherein the processor is configured to:

detect whether communications of a terminal device in a first frequency band satisfy a predetermined condition; and send predetermined signaling to the terminal device when the communications in the first frequency band satisfy the predetermined condition, the predetermined signaling being configured for instructing the terminal device to send a reference signal in a second frequency band;

wherein the first frequency band is different from the second frequency band.

According to an eighth aspect of the present disclosure, there is provided a terminal device, including:

a processor; and a memory for storing instructions executable by the processor;

wherein the processor is configured to:

communicate with an access network equipment in a first frequency band;

receive a predetermined instruction sent by the access network equipment, the predetermined instruction being sent by the access network equipment when communications in the first frequency band satisfy a predetermined condition; and send a reference signal in a second frequency band;

wherein the first frequency band is different from the second frequency band.

According to a ninth aspect of the present disclosure, there is provided a terminal device, including:

a processor; and a memory for storing instructions executable by the processor;

wherein the processor is configured to:

communicate with a first access network equipment in a first frequency band;

detect whether communications in a first frequency band satisfy a predetermined condition; and send a reference signal in a second frequency band when the communications in the first frequency band satisfy the predetermined condition;

wherein the first frequency band is different from the second frequency band.

According to a tenth aspect of the present disclosure, there is provided a system for mobile communication, including: an access network equipment and a terminal device;

the access network equipment including the apparatus according to the fourth aspect and any optional embodiment; and the terminal device including the apparatus according to the fifth aspect and any optional embodiment.

According to an eleventh aspect of the present disclosure, there is provided a system for mobile communication, including: an access network equipment and a terminal device;

the terminal device including the apparatus according to the sixth aspect and any optional embodiment.

According to a twelfth aspect of the present disclosure, there is provided a system for mobile communication, including: an access network equipment and a terminal device;

the access network equipment being the access network equipment according to the fourth aspect; and the terminal device being the terminal device according to the eighth aspect.

According to a thirteenth aspect of the present disclosure, there is provided a system for mobile communication, including: an access network equipment and a terminal device;

the terminal device being the terminal device according to the ninth aspect.

Various embodiments of the present disclosure can have one or more of the following beneficial effects:

by sending the reference signal in the second frequency band through the terminal device when the communications between the terminal device and the access network equipment in the first frequency band satisfy the predetermined condition, the present disclosure solves a problem of lower efficiency for sending the reference signal by the access network equipment when a networking environment is comparatively complicated; and achieves the effects of being not only capable of sending the reference signal by the terminal device, but also selectively sending the reference signal in the second frequency band according to the specific communication situation of the first frequency band, improving the efficiency of the terminal device for sending the reference signal, and reducing the power consumption needed by the terminal device for sending the reference signal in the second frequency band.

It is to be understood that both the foregoing general description and the following detailed description are exemplary and explanatory only and are not restrictive of the invention.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
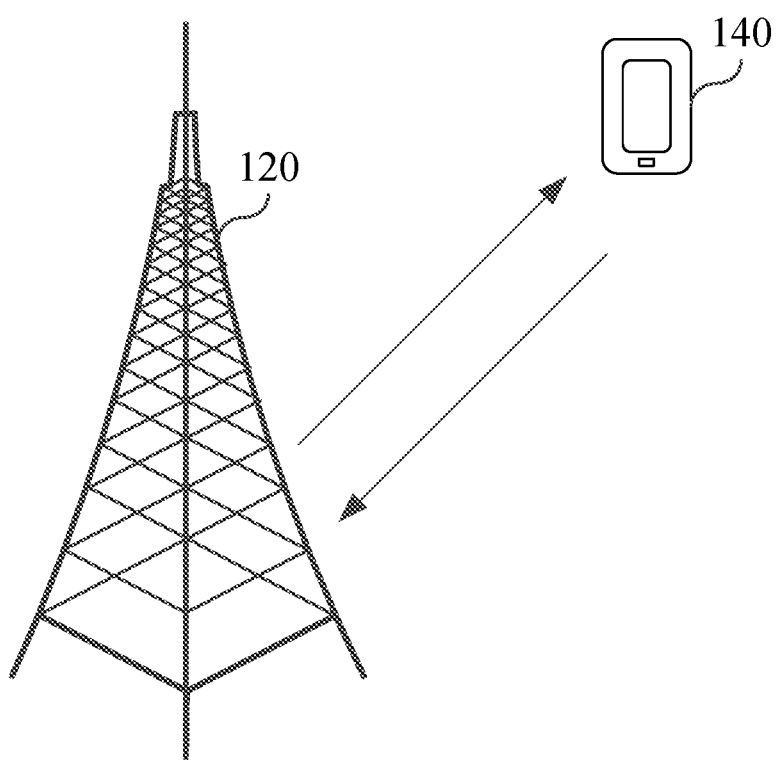
FIG. 1 shows a structure diagram of a system for mobile communication according to some embodiments.

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The term "unit" mentioned herein refers to a program or instruction stored in a memory and capable of implementing some functions, or a portion of a device implemented with software and/or hardware; the term "module" mentioned herein refers to a functional structure divided logically, and the "module" can be implemented in pure software or hardware, or in combination of both. The various device components, blocks, or portions may have modular configurations, or are composed of discrete components, but nonetheless may be referred to as "modules" in general. In other words, the "modules" referred to herein may or may not be in modular forms.

The term "plurality" mentioned herein is defined as two or more than two. The term "and/or" describes an association relationship of associated objects, and represents that there may be three relationships. For example, A and/or B may represent three situations including the single existence of A, the simultaneous existence of A and B, and the single existence of B. The symbol "/" generally represents that contextual objects are in an "or" relationship.

In a 4-Generation (4G) system for mobile communication, for instance, in an LTE system, an access network equipment usually provides a wireless communication service to a UE in a unit of cell, and the UE resides in a certain cell to use the wireless communication service. In the 4G system, the access network equipment usually refers to an eNB.

With the development of networking technologies of a mobile communication network, the implementation manners for the eNB and corollary equipment include, but are not limited to: a macro eNB, a micro eNB, a repeater, and the like. The macro eNB is generally a tower eNB, and each macro eNB may cover dozens of kilometers. The micro eNB is a small eNB installed in a building, a compact district or indoors, has a small coverage area, and is mainly disposed in an area that cannot be covered by the macro eNB. The repeater is a signal relay, which amplifies a radio-frequency signal sent by the eNB according to requirements, cannot provide capacity by itself, and is mainly applied in an area with a poor coverage and a relatively small capacity demand. A Radio Access Network (RAN) formed by the eNB in such forms like macro eNB, micro eNB and repeater is no longer a typical and regular cellular network. For this purpose, there is a technical improvement idea: changing the conventional mechanism of sending a reference signal by the eNB and measuring a network by the UE into a mechanism of sending the reference signal by the UE and measuring the network by the eNB. Under this technical improvement idea, the UE is deemed to be similar to a "mobile eNB," and the UE will initiatively send various reference signals for the eNB to measure the network.

The inventors of the present disclosure have recognized, during the technical improvement process, that a 5-Generation (5G) system for mobile communication supports more frequency bands. Besides a conventional frequency band lower than 6 GHz or a low frequency band, for instance, a 2 GHz frequency band supported in the 4G system, the 5G system also supports a high frequency band higher than 6 GHz, for instance, a 20 GHz+frequency band. Because the propagation characteristics of the low frequency band and the high frequency band vary greatly, radio signals sent by the high frequency band are quickly decayed; when a terminal device powered by a battery uses a form of "high frequency band+low frequency band" to send the reference signal, not only the sending efficiency of the reference signal is very low, and an uplink interference is easily formed between various terminal devices, but also the battery power of the terminal device will be depleted very quickly. Usually, the direction of sending signals from the UE to the eNB is called as "uplink," and the direction of sending signals from the eNB to the UE is called as "downlink".

FIG. 1 shows a structure diagram of a system for mobile communication according to some embodiments. The system for mobile communication includes: an access network equipment 120 and a terminal device 140.

The access network equipment 120 has functions of sending a downlink reference signal, receiving an uplink reference signal, sending a downlink data or instruction, and receiving an uplink data or instruction. In different systems for mobile communication, the access network equipment 120 has the same or similar functions, but may have different names or implementation manners. Optionally, the access network equipment 120 is a Base Transceiver Station (BTS) in a Global System for Mobile communication (GSM) or a Code Division Multiple Access (CDMA). Optionally, the access network equipment is a NodeB in a Universal Mobile Telecommunications System (UMTS). Optionally, the access network equipment is an evolutional Node B (eNB or e-NodeB) in Long Term Evolution (LTE). During actual networking, the implementation manner of the access network equipment 120 may be a macro eNB, a micro eNB, a micro-micro eNB, a repeater, or the like. The particular number and particular position of the access network equipment 120 are not defined in the embodiments of the present disclosure.

The terminal device 140 has the functions of sending an uplink reference signal, receiving a downlink reference signal, sending an uplink data or instruction, and receiving a downlink data or instruction. In different systems for mobile communication, the terminal device 140 has the same or similar functions, but may have different names or implementation manners. Optionally, the terminal device 140 may be a subscriber unit, a subscriber station, a mobile station, a mobile, a remote station, an access point, a remote terminal, an access terminal, a user terminal, a user agent, a user device, or a User Equipment (UE). During actual networking, the implementation manner of the terminal device 140 may be a mobile phone, a tablet, a smart household appliance, a smart instrument, a device of Internet of Things, a device of Internet of Vehicles, or the like. The particular number and particular position of the terminal device 140 are not defined in the embodiments of the present disclosure.

In general, the terminal device 140 will reside in a cell provided by a certain access network equipment 120. The terminal device 140 is communicated with the access network equipment 120. In embodiments of the present disclosure, the communication may either refer to a unilateral communication or a bilateral communication. For example, the terminal device 140 sends an uplink reference signal to the access network equipment 120; no matter whether the access network equipment 120 receives the uplink reference signal and makes a response, it is deemed that the terminal device 140 has communicated with the access network equipment 120. For another example, the access network equipment 120 sends a downlink reference signal to the terminal device 140; no matter whether the terminal device 140 receives the downlink reference signal and makes a response, it is deemed that the terminal device 140 has communicated with the access network equipment 120. For further another example, the terminal device 140 sends uplink data to the access network equipment 120 according to the scheduling of the access network equipment 120 and the uplink data is successfully received, then it is also deemed that the terminal device 140 has communicated with the access network equipment 120.

Optionally, the access network equipment 120 is communicated with the terminal device 140 through a radio carrier. The radio carrier is corresponding to a plurality of frequency bands. In a system for mobile communication such as 5G the radio carrier is corresponding to low frequency bands and at least one high frequency band. Schematically, the low frequency band refers to a frequency band lower than 6 GHz, while the high frequency band refers to a frequency band higher than 6 GHz, for instance, a 10 GHz frequency band, a 20 GHz frequency band, or the like. The radio carrier of the high frequency band is decayed quickly during transmission. That is, signals having the same energy will be transmitted for a relatively long distance in the low frequency band; and will be transmitted for a relatively short distance in the high frequency band.

Each access network equipment 120 supports communications of at least one frequency band. For instance, the macro eNB supports the communications of all available frequency bands, a first micro eNB supports the communications of the low frequency band and one high frequency band at the same time, while a second micro eNB supports the communications of one high frequency band only.

Figure 2:
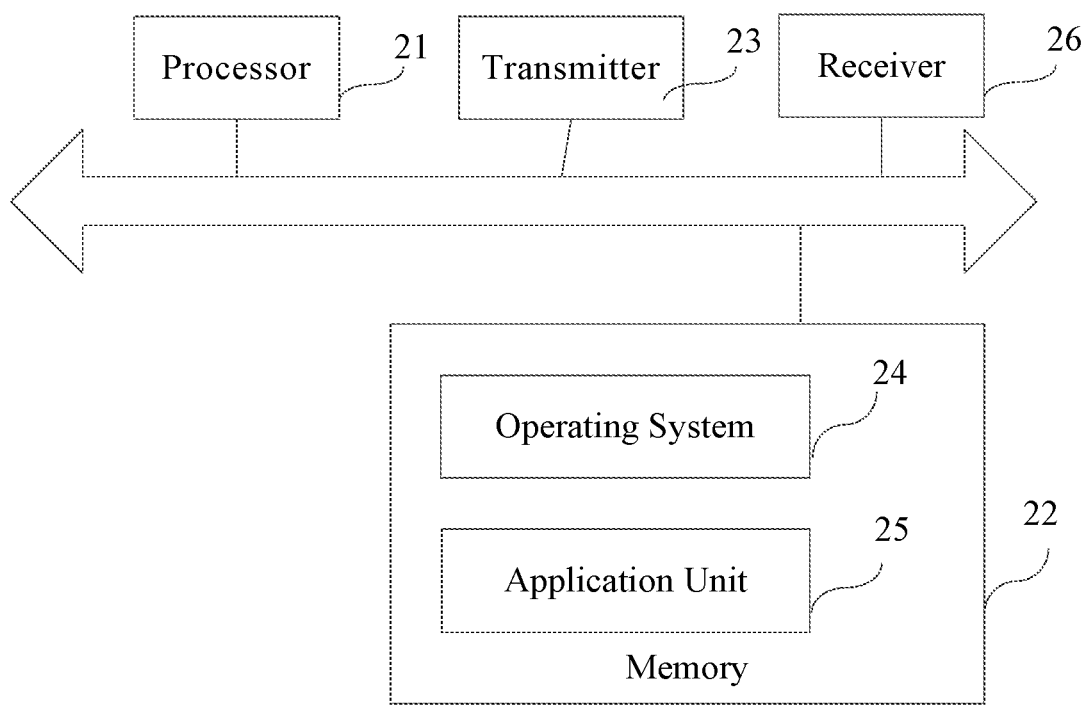
FIG. 2 shows a structure diagram of an access network equipment according to some embodiments.

FIG. 2 shows a structure diagram of an access network equipment 120 according to some embodiments. The access network equipment 120 includes: a processor 21, a memory device 22, a transmitter 23 and a receiver 26.

The processor 21 is connected with the memory 22.

The processor 21 includes one or more than one processing core, and the processor 21 performs various function applications and information processing through operating software programs and units.

The memory 22 may be used for storing the software programs and units. The memory 22 may also store an operating system 24, and an application unit 25 required by at least one function.

The application unit 25 may include a processing unit and a sending unit. The processing module is configured to detect whether communications of a terminal device in a first frequency band satisfy a predetermined condition; and the sending module is configured to send predetermined signaling to the terminal device when the communications in the first frequency band satisfy the predetermined condition, the predetermined signaling being configured to instruct the terminal device to send a reference signal in a second frequency band; wherein the first frequency band is different from the second frequency band.

Moreover, the memory 22 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The transmitter 23 includes: a modem unit and a multiple input multiple output (MIMO) antenna, and the MIMO antenna is an antenna that supports sending and receiving via multiple antenna ports. Optionally, the MIMO antenna includes at least two transmitting antennas. Optionally, the transmitter 23 is configured to implement modulation-demodulation and sending of the reference signal.

The receiver 26 includes a structure identical or similar to that of the transmitter 23. Optionally, the receiver 26 includes a modem unit and an MIMO antenna, and the MIMO antenna includes at least two receiving antennas.

It will be understood by those skilled in the art that the structure of the access network equipment 120 shown in FIG. 2 is not construed as limiting the access network equipment 120, instead, fewer or more components than what are shown in the drawings may be included, or some components may be combined, or different component arrangement may be used.

Figure 3:
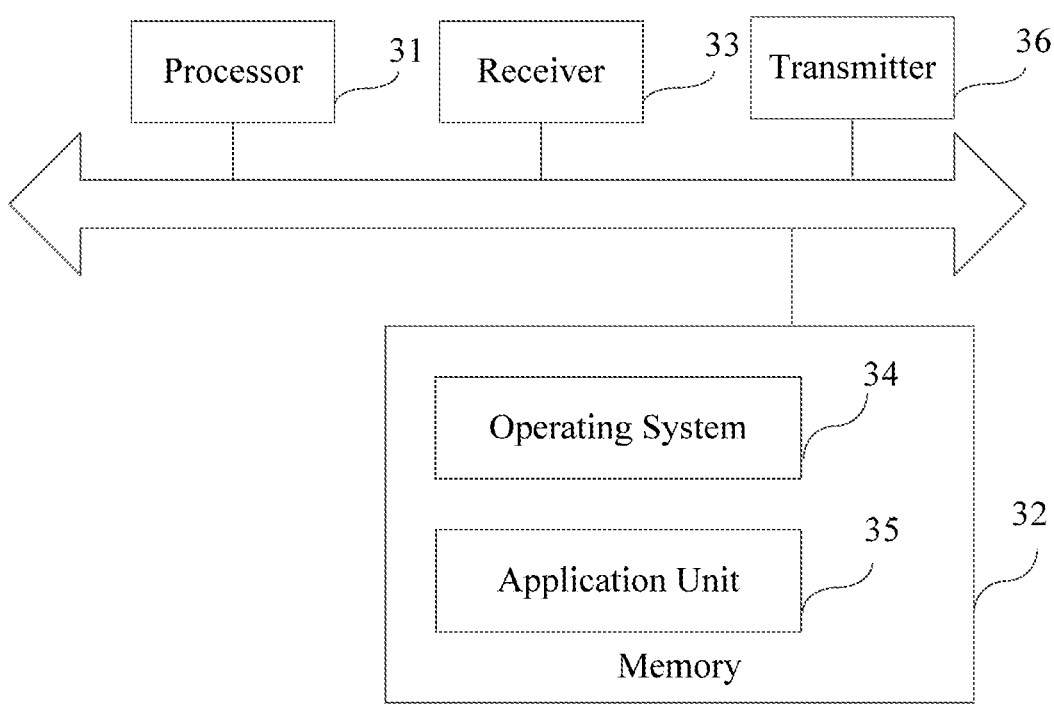
FIG. 3 shows a structure diagram of a terminal device according to some embodiments.

FIG. 3 shows a structure diagram of a terminal device 140 according to some embodiments. The terminal device 140 includes: a processor or processing circuit 31, a memory device 32, a receiver 33, and a transmitter 36.

The processor 31 is connected with the memory device 32.

The processor 31 includes one or more than one processing core, and the processor 31 performs various function applications and information processing through operating software programs and units.

The memory 32 may be used for storing the software programs and units. The memory 32 may also store an operating system 34, and an application unit 35 required by at least one function.

The application unit 35 may include a processing unit, a receiving unit and a sending unit. The processing module is configured to communicate with an access network equipment in a first frequency band; the receiving module is configured to receive a predetermined instruction sent by the access network equipment, the predetermined instruction being sent by the access network equipment when the communications in the first frequency band satisfy a predetermined condition; and the sending module is configured to send a reference signal in a second frequency band; wherein the first frequency band is different from the second frequency band.

Alternatively, the application unit 35 may include a processing unit which is configured to communicate with a first access network equipment in the first frequency band, the processing module being configured to detect whether the communications in the first frequency band satisfy a predetermined condition; and a sending module configured to send a reference signal in a second frequency band when the communications in the first frequency band satisfy the predetermined condition; wherein the first frequency band is different from the second frequency band.

Moreover, the memory 32 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The receiver 33 includes: a modem unit and an MIMO antenna, and the MIMO antenna is an antenna that supports sending and receiving by multiple antenna ports. Optionally, the MIMO antenna includes at least two receiving antennas. Optionally, the receiver 33 is configured to implement modulation-demodulation and receiving of the reference signal.

The transmitter 36 includes a structure identical or similar to the receiver 33. Optionally, the transmitter 36 includes a modem unit and an MIMO antenna. Optionally, the MIMO antenna includes at least two transmitting antennas.

It will be understood by those skilled in the art that the structure of the terminal device 140 shown in FIG. 3 is not construed as limiting the terminal device 140, instead, fewer or more components than what are shown in the drawings may be included, or some components may be combined, or different component arrangements may be used.

Figure 4:
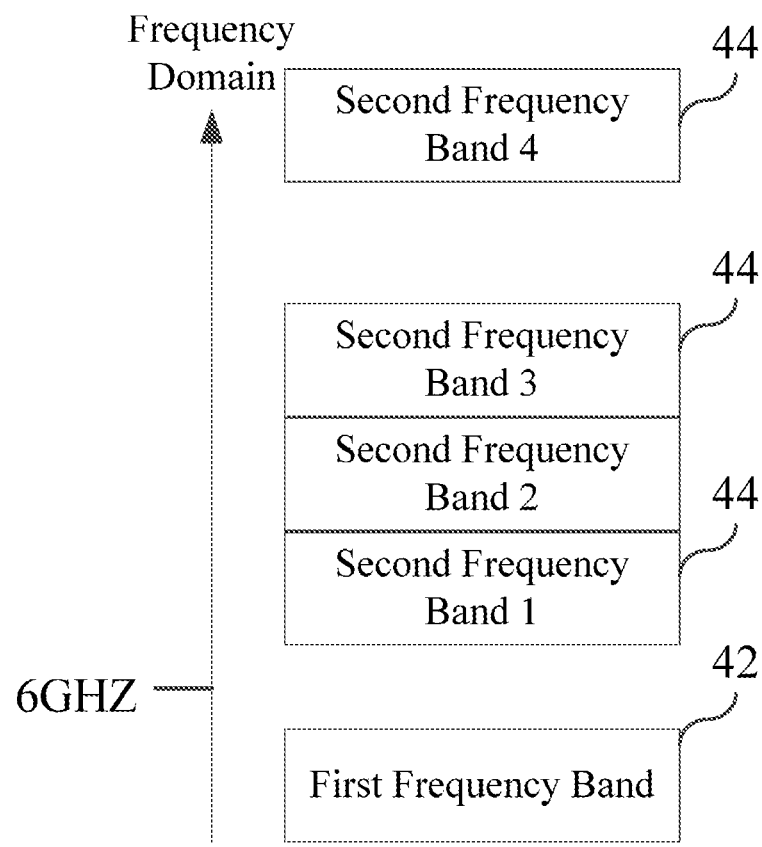
FIG. 4 shows a schematic diagram of dividing a first frequency band and a second frequency band according to some embodiments.

FIG. 4 shows a schematic diagram of dividing a first frequency band and a second frequency band according to some embodiments. Optionally, a first frequency band 42 involved in the embodiment of the present disclosure belongs to a low frequency band, and a second frequency band 44 belongs to a high frequency band, wherein the number of the second frequency band 44 may be more than one. In other words, a plurality of second frequency bands 44 may be adjacent in a frequency domain according to different frequency band division forms, or, there may be two second frequency bands 44 mutually spaced in the frequency domain, or there may be two second frequency bands 44 mutually spaced in the frequency domain and no other second frequency band exists between the two second frequency bands 44.

The frequency band may also be called as a frequency range in different embodiments. Each frequency band may have the same frequency bandwidth, for instance, 15 kHz, 30 kHz, 60 kHz, or the like. The bandwidth of each frequency band is not defined in the embodiment of the present disclosure, and is determined according to the specific embodiment.

It should be noted that although the embodiment of the present disclosure is illustrated by using the first frequency band that belongs to the low frequency band and the second frequency band that belongs to the high frequency band, the present disclosure is not limited thereto. In some optional embodiments, the first frequency band belongs to the high frequency band, and the second frequency band belongs to the low frequency band.

Figure 5:
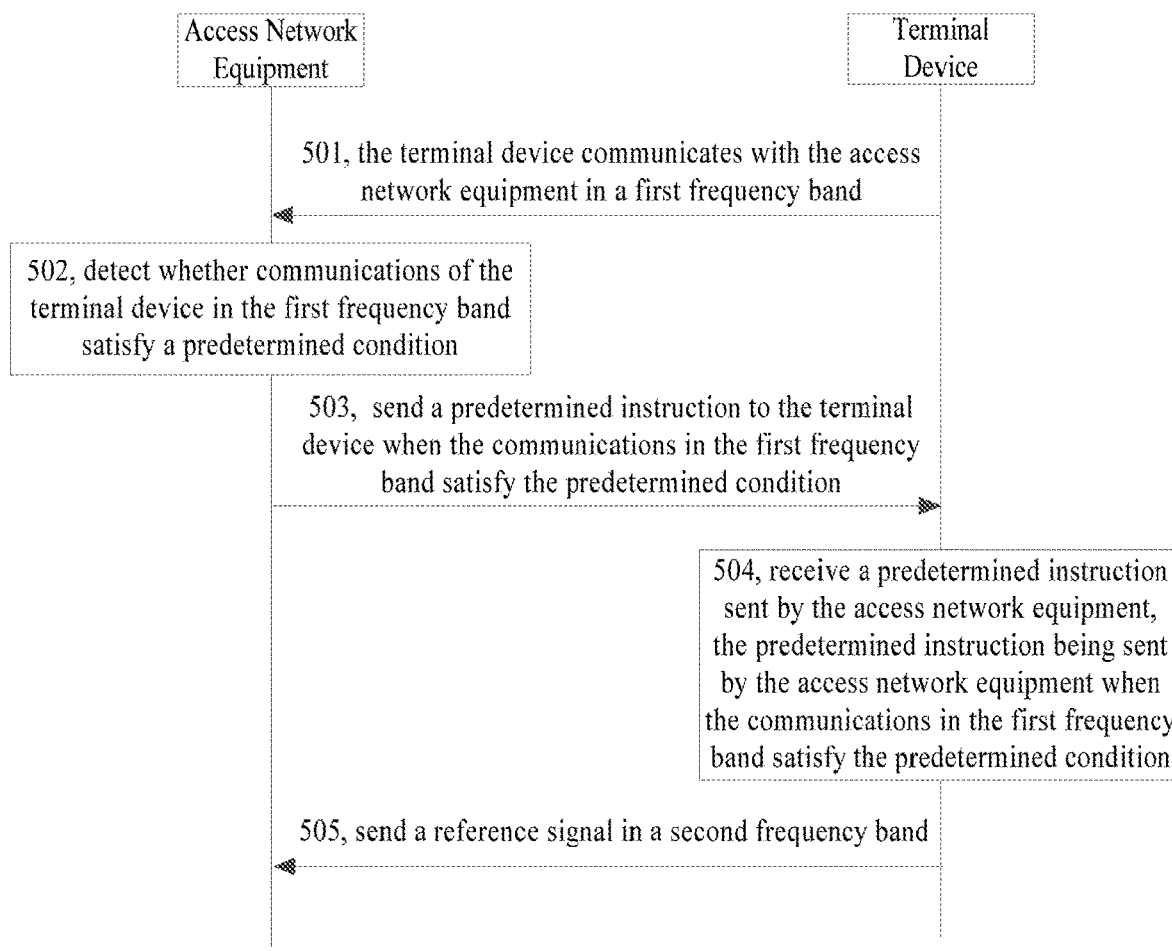
FIG. 5 shows a flow chart of a method for sending a reference signal according to some embodiments.

FIG. 5 shows a flow chart of a method for sending a reference signal according to some embodiments. The embodiment of the present disclosure is illustrated by applying the method for sending a reference signal into the system for mobile communication as shown in FIG. 1. The method for sending a reference signal includes the following steps.

In step 501, a terminal device communicates with an access network equipment in a first frequency band.

Optionally, the first frequency band belongs to the low frequency band. The "communications" include at least one of the following situations: sending, by the terminal device, a signal to the access network equipment; sending, by the access network equipment, a signal to the terminal device; sending, by the terminal device, a first signal to the access network equipment, and feeding, by the access network equipment, a second signal back to the terminal device based on the first signal; sending, by the access network equipment, a third signal to the terminal device, and feeding, by the terminal device, a fourth signal back to the access network equipment based on the third signal, and the like. Optionally, the signal refers to a reference signal or data, or the like, and the type or contents of the signal are not particularly defined in the embodiment of the present disclosure.

In step 502, the access network equipment detects whether communications of the terminal device in the first frequency band satisfy a predetermined condition.

The predetermined condition is a condition used for judging a communication state between the terminal device and the access network equipment. Optionally, when the first frequency band belongs to the low frequency band and the second frequency band belongs to the high frequency band, if the communication state in the first frequency band is better than the predetermined condition, communications of the terminal device in the second frequency band are triggered.

In step 503, the access network equipment sends a predetermined instruction to the terminal device when the communications in the first frequency band satisfy the predetermined condition.

The predetermined instruction is used for instructing the terminal device to send a reference signal in the second frequency band.

Optionally, the predetermined instruction is sent by using dedicated signaling; optionally, the predetermined instruction is sent by using a predetermined bit in the existing signaling; optionally, the predetermined instruction is impliedly shown by using some specific attributes of the existing signaling, for instance, the access network equipment schedules a time-frequency resource belonging to the second frequency band to the terminal device, thus impliedly hinting the terminal device to send the reference signal in the second frequency band.

The existing signaling refers to signaling already existed in 2G/3G/4G systems.

In step 504, the terminal device receives the predetermined instruction sent by the access network equipment, the predetermined instruction being sent by the access network equipment when the communications in the first frequency band satisfy the predetermined condition.

In step 505, the terminal device sends the reference signal in the second frequency band.

In the embodiments of the present disclosure, the types of uplink reference signals sent by the terminal device are not limited to a demodulation reference signal (DMRS), a sounding reference signal (SRS) and a channel state information reference signal (CSI-RS); moreover, the terminal device may initiatively send newly added uplink reference signals, and these newly added uplink reference signals have functions identical or similar to some downlink reference signals in the LTE. For instance, the terminal device is deemed as a "mobile eNB," and the terminal device sends a cell-specific reference signal (CRS). Therefore, the uplink reference signals in the embodiment of the present disclosure refer to any probable reference signal sent by the terminal device, and these reference signals may be used for channel evaluation or channel state measurement, or the like.

Optionally, the access network equipment receives the reference signal sent by the terminal device in the second frequency band, and performs channel evaluation or channel state information measurement on channels in the second frequency band according to the reference signal.

Therefore, by sending the reference signal in the second frequency band through the terminal device when the communications between the terminal device and the access network equipment in the first frequency band satisfy the predetermined condition, the method for sending a reference signal provided by the embodiment solves a problem of lower efficiency for sending the reference signal by the access network equipment when a networking environment is comparatively complicated; and achieves the effects of being not only capable of sending the reference signal by the terminal device, but also selectively sending the reference signal in the second frequency band according to the specific communication situation of the first frequency band, improving the efficiency of the terminal device for sending the reference signal, and reducing the power consumption needed by the terminal device for sending the reference signal in the second frequency band.

Optionally, "communicating in the first frequency band" may be deemed as using the time-frequency resource that belongs to the first frequency band to communicate; Optionally, "sending the reference signal in the second frequency band" may be deemed as using the time-frequency resource that belongs to the second frequency band to communicate.

Optionally, the time domain resource refers to a symbol, a symbol group, a slot or a subframe, wherein the symbol is a symbol of an LTE system in which one sub-carrier has a frequency domain of 15 kHz, or the symbol is a symbol of a communication system in which one sub-carrier has a frequency domain greater than 15 kHz; the slot is a slot of the LTE system in which one sub-carrier has a frequency domain of 15 kHz, or a slot of the communication system in which one sub-carrier has a frequency domain greater than 15 kHz, wherein the length may be less than 0.5 ms; the subframe is a subframe of the LTE system in which one sub-carrier has a frequency domain of 15 kHz, or a subframe of the communication system in which one sub-carrier has a frequency domain greater than 15 kHz, wherein the length may be less than 1 ms, which will not be defined in the embodiment. For example, the frequency domain greater than 15 kHz where one sub-carrier locates may be 30 kHz, 60 kHz and 120 kHz, which will not be defined in the embodiment.

Optionally, the frequency domain resource is a short physical resource block (SPRB), a short physical resource block group (SRBG), a short virtual resource block (SVRB), a sub-carrier or a sub-carrier group. The SPRB and the SVRB are fundamental units for resource allocation with different meanings respectively. The SPRB refers to a resource of 12 successive sub-carriers in a frequency domain and one transmission time length in a time domain, wherein the transmission time length may be any symbol number from one symbol to 14 symbols. During a centralized resource allocation, the definitions of the SVRB and the SPRB are the same, while during a distributed resource allocation, there is a certain corresponding relationship between the SVRB and the SPRB.

An SPRB index is an index of SPRB while an SVRB index is an index of SVRB; therefore, the SPRB index and the SVRB index may be different. The SRBG may include a plurality of SPRBs, and the number of the SPRBs included in the SRBG are determined according to the bandwidth of the terminal device or obtained according to the instruction of a network device. The SPRB index may be a serial number of the SPRB, an SRBG index may be a serial number of the SRBG the SVRB index may be a serial number of the SVRB, a sub-carrier index may be a serial number of the sub-carrier, and a sub-carrier group index may be a serial number of the sub-carrier group. The sub-carrier group includes at least one sub-carrier, and a frequency domain in which one sub-carrier locates herein may be equal to or greater than 15 kHz.

Optionally, the first frequency band belongs to the low frequency band, and the second frequency band belongs to the high frequency band. That is, an upper frequency limit of the first frequency band is less than a lower frequency limit of the second frequency band.

Optionally, the number of the second frequency band is n, and each of the second frequency band is corresponding to respective predetermined condition. The n is a positive integer.

In a first implementation manner, the predetermined condition includes at least one of the following conditions:

a signal intensity of a first signal being greater than a preset intensity;

a receiving power of the first signal being greater than a preset power;

a receiving quality of the first signal being greater than a preset quality; or an error rate of the first signal being less than a preset value;

wherein the first signal is a signal sent by the terminal device in the first frequency band.

In a second implementation manner, the predetermined condition includes:

a distance between a first geographical position of the terminal device when using the first frequency band to communicate and a second geographical position of a predetermined access network equipment being less than a preset threshold; or, the first geographical position of the terminal device when using the first frequency band to communicate belonging to a predetermined region, and the predetermined region being a region determined according to the predetermined access network equipment;

wherein, the predetermined access network equipment is an access network equipment that supports the second frequency band.

In a third implementation manner, the predetermined condition includes:

an antenna number of multiple-input multiple-output MIMO antennas used when receiving a first signal exceeding a preset number; or, an antenna position of the MIMO antenna used when receiving the first signal complying with a preset position; or, the antenna number of the MIMO antennas used when receiving the first signal exceeding the preset number, and the antenna position complying with the preset position;

wherein the first signal is a signal send by the terminal device in the first frequency band, and the antenna position refers to a position of the MIMO antenna used relative to an MIMO antenna array.

In a fourth implementation manner, the predetermined condition includes:

a signal parameter of a signal sent by the terminal device in the first frequency band and received by a second access network equipment complying with a first condition; or, the signal parameter of the signal sent by the terminal device in the first frequency band and received by the second access network equipment complying with a second condition, and the signal parameter of a signal sent by the terminal device in the first frequency band and received by the first access network equipment complying with a third condition;

wherein the signal parameter includes: at least one of a signal intensity, a signal power, a signal quality, or a signal error rate.

In a fifth implementation manner, the predetermined condition includes:

a signal receiving intensity of a first positioning signal received by the terminal device being less than a first intensity; or, the signal receiving intensity of a first positioning signal received by the terminal device being less than the first intensity, and a signal receiving intensity of a second positioning signal received by the first access network equipment being less than a second intensity; or, a difference between the signal receiving intensity of a first positioning signal received by the terminal device and the signal receiving intensity of a second positioning signal received by the first access network equipment being less than a preset difference;

wherein the first positioning signal is a positioning signal received by the terminal device when using the first frequency band to communicate.

Figure 6:
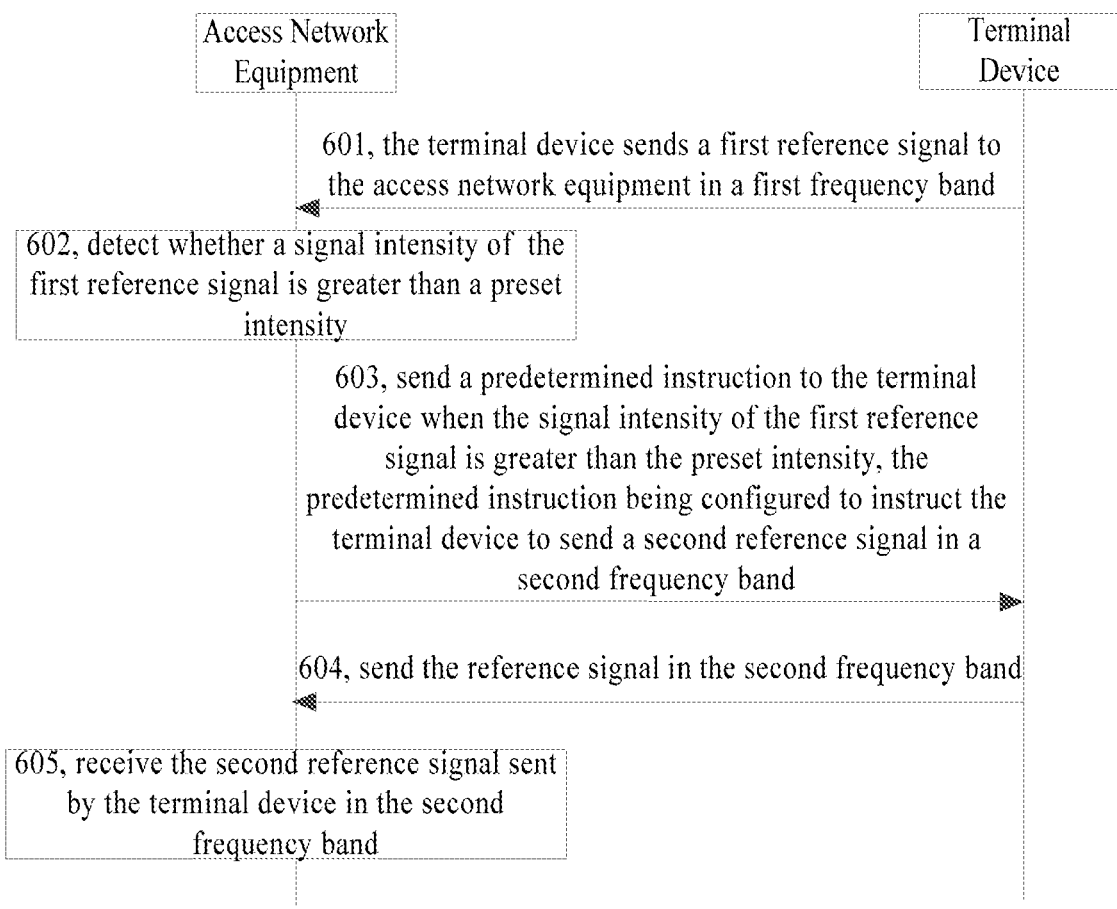
FIG. 6 shows a flow chart of a method for sending a reference signal according to some other embodiments.

With respect to the first implementation manner of the predetermined condition, FIG. 6 shows a flow chart of a method for sending a reference signal according to some other embodiments. The embodiment of the present disclosure is illustrated by using a first signal as a first reference signal. The method for sending a reference signal includes the following steps.

In step 601, a terminal device sends a first reference signal to an access network equipment in a first frequency band.

Optionally, the first frequency band belongs to the low frequency band.

In step 602, the access network equipment detects whether a signal intensity of the first reference signal is greater than a preset intensity.

In step 603, the access network equipment sends a predetermined instruction to the terminal device when the signal intensity of the first reference signal is greater than the preset intensity, the predetermined instruction being configured to instruct the terminal device to send a second reference signal in a second frequency band.

Optionally, the access network equipment sends the predetermined instruction to the terminal device in the first frequency band. Correspondingly, the terminal device receives the predetermined instruction sent by the access network equipment.

In step 604, the terminal device sends a second reference signal to the access network equipment in the second frequency band.

Optionally, the second frequency band belongs to a high frequency band, and the lower frequency limit of the second frequency band is higher than the upper frequency limit of the first frequency band.

In step 605, the access network equipment receives the second reference signal sent by the terminal device in the second frequency band.

Optionally, the access network equipment performs channel evaluation or channel state information measurement according to the second reference signal.

It should be noted that the access network equipment in the embodiment may be an access network equipment corresponding to a cell where the terminal device is preparing to reside or is residing.

Therefore, by instructing the terminal device to send the second reference signal in the second frequency band through the access network equipment when the signal intensity of the first reference signal sent in the first frequency band is greater than the preset intensity, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and also saving the power consumption needed by the terminal device needed for sending the second reference signal.

As an alternative implementation manner, step 602 may be replaced by the following step: the access network equipment detects whether a receiving power of the first reference signal (Reference Signal Receiver Power, RSRP) is greater than a preset power; as another alternative implementation manner, step 602 may be replaced by that: the access network equipment detects whether a receiving quality of the first reference signal (Reference Signal Receiver Quality, RSRQ) is greater than a preset quality. As yet another alternative implementation manner, the foregoing first reference signal is replaced by the first signal, wherein the first signal is a signal sent by the terminal device in the first frequency band, which may either be an uplink reference signal or a data signal, then step 602 may be replaced by that: the access network equipment detects whether an error rate of the first signal is less than a preset value.

Figure 7A:
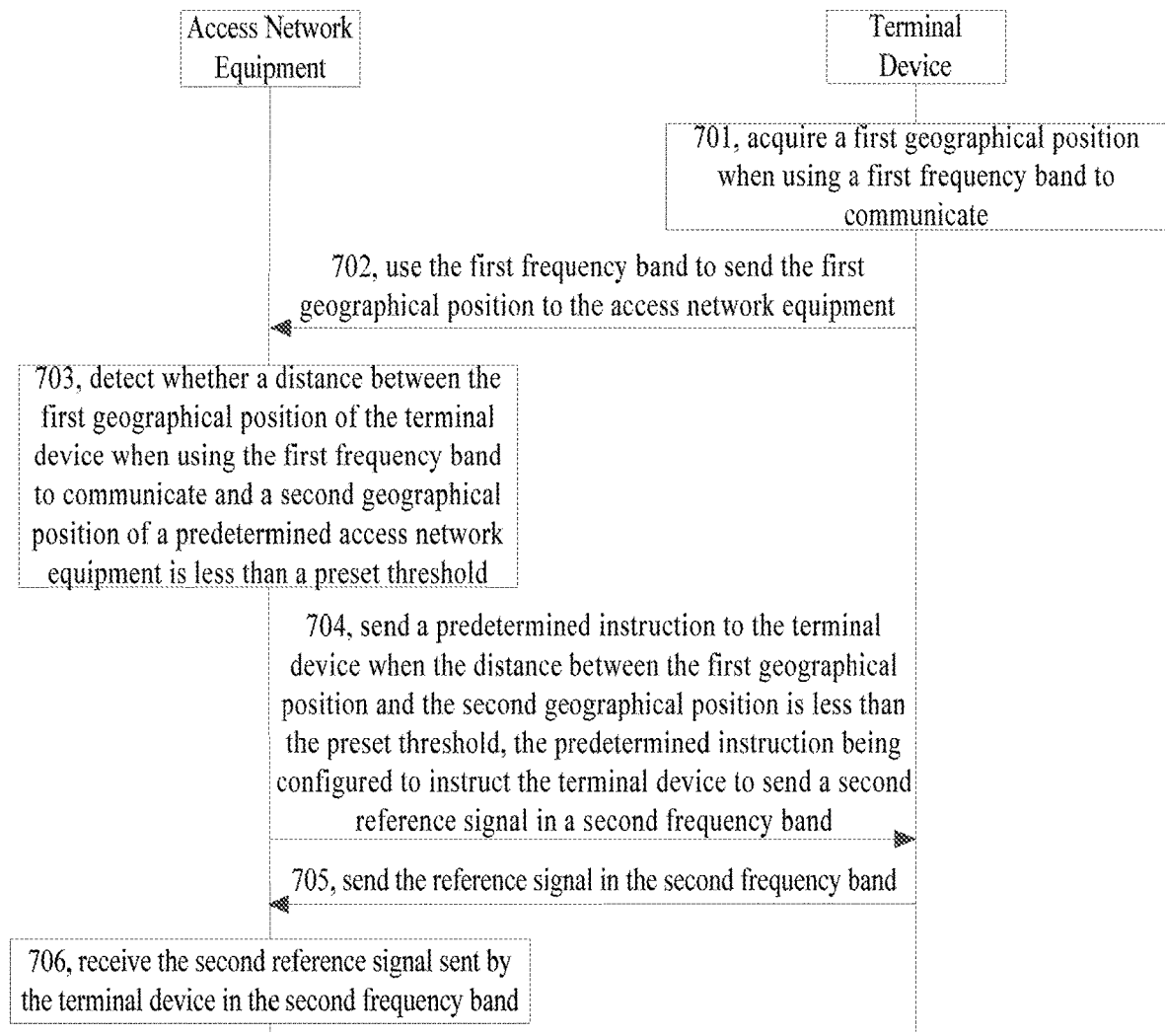
FIG. 7A shows a flow chart of a method for sending a reference signal according to some other embodiments.

With respect to the second implementation manner of the predetermined condition, FIG. 7A shows a flow chart of a method for sending a reference signal according to some other embodiments. The method for sending a reference signal includes the following steps.

In step 701, a terminal device acquires a first geographical position when using a first frequency band to communicate.

Optionally, the first frequency band belongs to a low frequency band. The terminal device acquires the first geographical position of itself while using the first frequency band to communicate with an access network equipment.

Optionally, the terminal device acquires the first geographical position of itself through a global positioning system (GPS). The positioning modes are not defined in the embodiment. The geographical position may also be positioned through a Beidou system, a wireless access point, or the like.

In step 702, the terminal device uses the first frequency band to send the first geographical position to the access network equipment.

Correspondingly, the access network equipment receives the first geographical position sent by the terminal device.

Optionally, the sending mode of step 702 is not defined in the embodiment. If the terminal device sends the first geographical position to the access network equipment through other route except the first frequency band, then it may be used as an equivalent alternative implementation manner of step 702.

In step 703, the access network equipment detects whether the distance between the first geographical position of the terminal device when using the first frequency band to communicate and a second geographical position of a predetermined access network equipment is less than a preset threshold.

The access network equipment pre-stores the second geographical position of itself. Optionally, the access network equipment also stores a second geographical position of other access network equipment. The second geographical position of each access network equipment is invariant usually.

The predetermined access network equipment is an access network equipment that supports the second frequency band. The predetermined access network equipment may either be the access network equipment in step 701 and step 702, or an access network equipment different from the access network equipment in step 701 and step 702.

In step 704, the access network equipment sends a predetermined instruction to the terminal device when the distance between the first geographical position and the second geographical position is less than the preset threshold, the predetermined instruction being configured to instruct the terminal device to send a second reference signal in a second frequency band.

Optionally, the access network equipment sends the predetermined instruction to the terminal device in the first frequency band.

In step 705, the terminal device sends the second reference signal in the second frequency band.

Optionally, the second frequency band belongs to a high frequency band, and the lower frequency limit of the second frequency band is higher than the upper frequency limit of the first frequency band.

In step 706, the access network equipment receives the second reference signal sent by the terminal device in the second frequency band.

Optionally, the access network equipment performs channel evaluation or channel state information measurement according to the second reference signal.

Therefore, by instructing the terminal device to send the second reference signal in the second frequency band through the access network equipment when the distance between the first geographical position of the terminal device and the second geographical position of the access network equipment is less than the preset threshold, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and also saving the power consumption needed by the terminal device needed for sending the second reference signal.

Figure 7B:
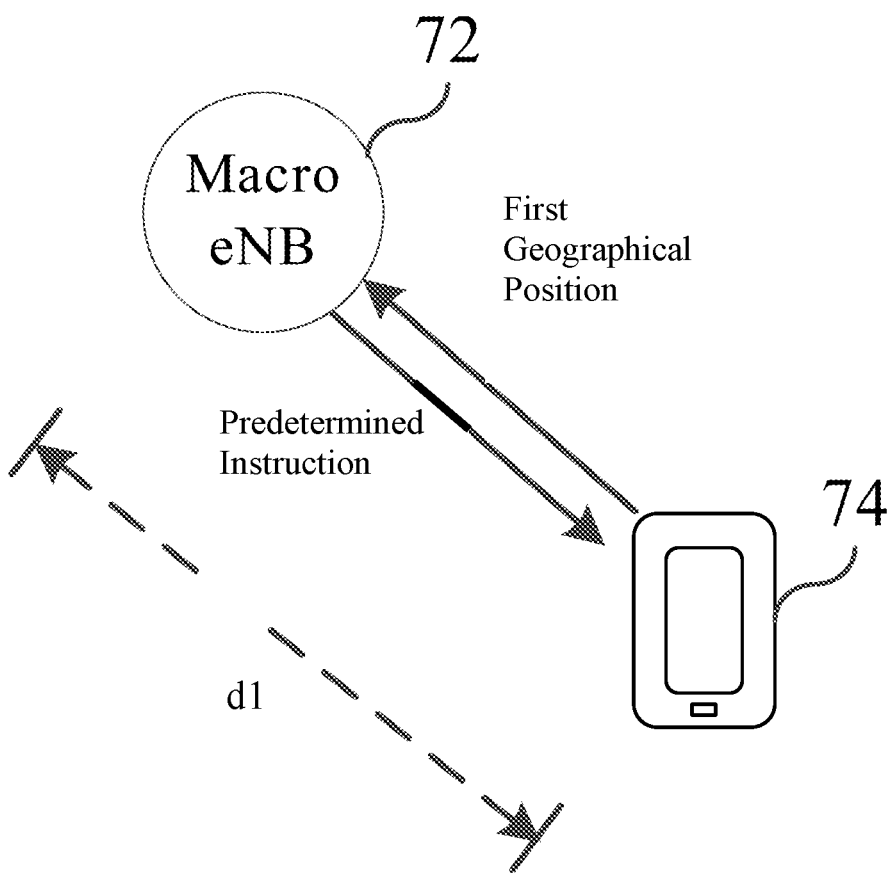
FIG. 7B shows a schematic diagram of the method for sending a reference signal in one implementation provided by the embodiment as shown in FIG. 7A.

In combination with FIG. 7B, a macro eNB 72 supports the first frequency band and the second frequency band at the same time, and the macro eNB 72 receives a first geographical position sent by a UE74 in the first frequency band; when the distance d1 between the first geographical position and a second geographical position of the macro eNB 72 is less than a preset threshold, the macro eNB 72 sends a predetermined instruction to the UE74, the predetermined instruction instructing the UE74 to send an uplink reference signal in the second frequency band.

Figure 7C:
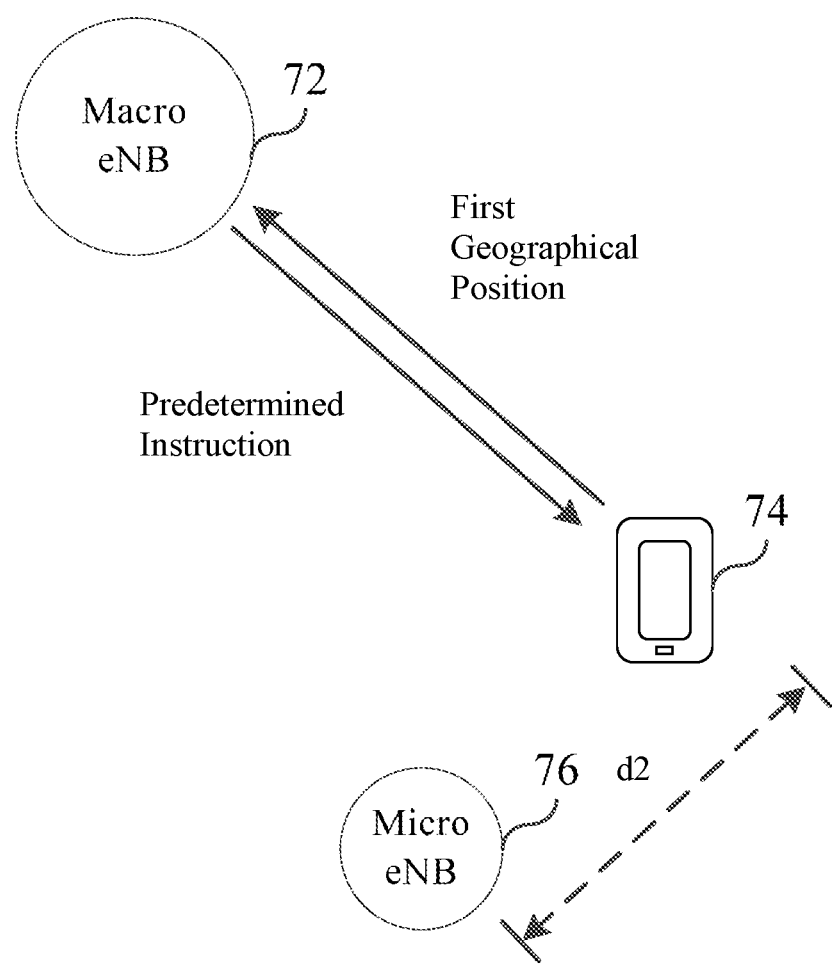
FIG. 7C shows a schematic diagram of the method for sending a reference signal in another implementation provided by the embodiment as shown in FIG. 7A.

In combination with FIG. 7C, the macro eNB 72 supports the first frequency band and the second frequency band at the same time, and an indoor micro eNB 76 supports the second frequency band. The macro eNB 72 receives the first geographical position sent by the UE74 in the first frequency band; when the distance d2 between the first geographical position and a second geographical position of the micro eNB 76 is less than a preset threshold, the macro eNB 72 sends a predetermined instruction to the UE74, the predetermined instruction instructing the UE74 to send an uplink reference signal in the second frequency band.

As an alternative implementation manner, step 703 may be replaced by that: the access network equipment detects whether the first geographical position of the terminal device when using the first frequency band to communicate belongs to a predetermined region, the predetermined region being a region determined according to the predetermined access network equipment. Usually, the predetermined region is a region determined by taking the predetermined access network equipment as a center, and the predetermined region may also be designed into an irregular region, or a region corresponding to an indoor layout. Therefore, an effect of triggering to send the uplink reference signal in the second frequency band is implemented when the terminal device is indoors.

Figure 8:
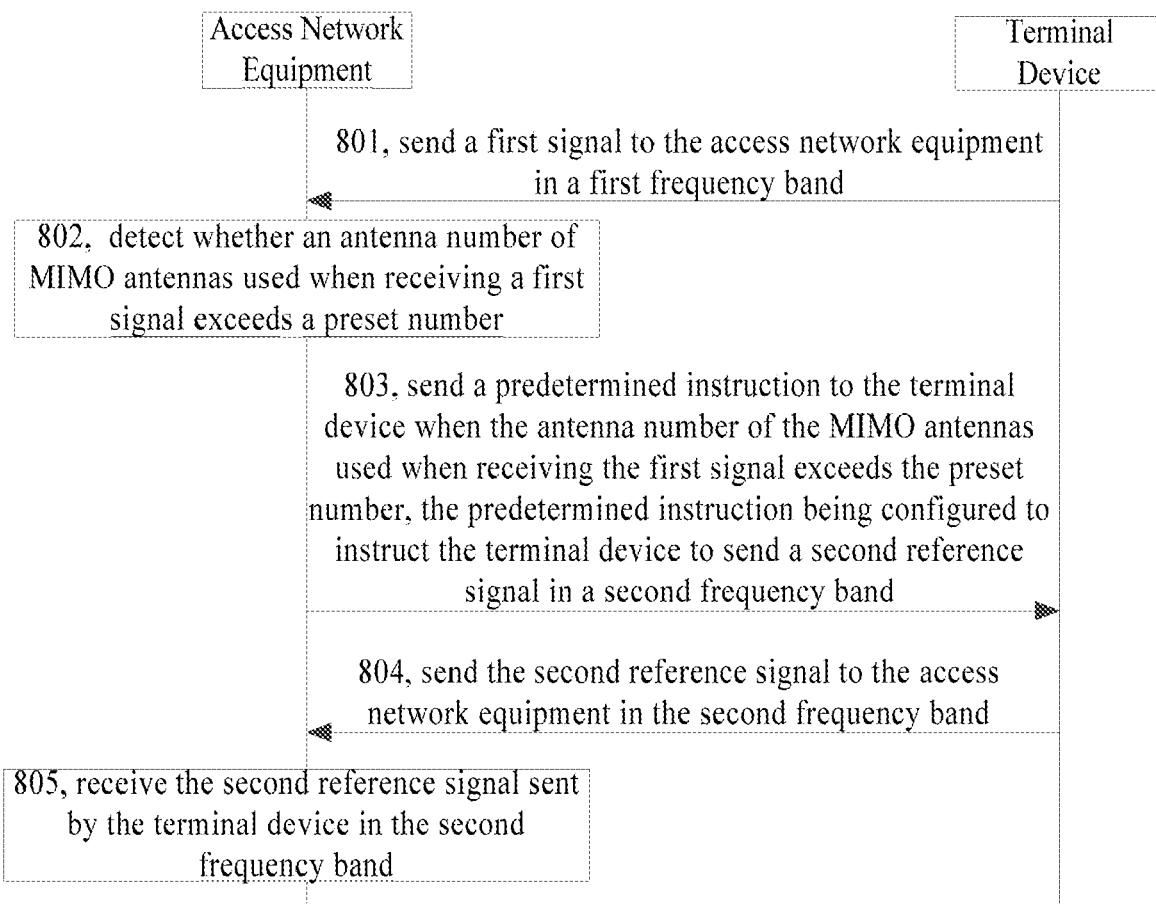
FIG. 8 shows a flow chart of a method for sending a reference signal according to some other embodiments.

With respect to the third implementation manner of the predetermined condition, FIG. 8 shows a flow chart of a method for sending a reference signal according to some other embodiments. The method for sending a reference signal includes the following steps.

In step 801, a terminal device sends a first signal to an access network equipment in a first frequency band.

Optionally, the first frequency band belongs to a low frequency band. The first signal is a signal sent by the terminal device in the first frequency band.

In step 802, the access network equipment detects whether an antenna number of multiple-input multiple-output (MIMO) antennas used when receiving the first signal exceeds a preset number.

For instance, the total number of the MIMO antennas of the access network equipment is 32, and the preset number is 20, then the access network equipment detects whether the antenna number of the MIMO antennas used when receiving the first signal exceeds 20.

In step 803, the access network equipment sends a predetermined instruction to the terminal device when the antenna number of the MIMO antennas used when receiving the first signal exceeds the preset number, the predetermined instruction being configured to instruct the terminal device to send a second reference signal in a second frequency band.

Optionally, the access network equipment sends the predetermined instruction to the terminal device in the first frequency band.

In step 804, the terminal device sends the second reference signal to the access network equipment in the second frequency band.

Optionally, the second frequency band belongs to a high frequency band, and the lower frequency limit of the second frequency band is higher than the upper frequency limit of the first frequency band.

In step 805, the access network equipment receives the second reference signal sent by the terminal device in the second frequency band.

Optionally, the access network equipment performs channel evaluation or channel state information measurement according to the second reference signal.

It should be noted that the access network equipment in the embodiment may be an access network equipment corresponding to a cell where the terminal device is preparing to reside or is residing.

Therefore, by instructing the terminal device to send the second reference signal in the second frequency band through the access network equipment when the number of the used MIMO antennas is greater than the preset number, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and saving the power consumption needed by the terminal device needed for sending the second reference signal.

As an alternative implementation manner, step 802 may be replaced by that: the access network equipment detects whether the antenna position of the MIMO antenna used when receiving the first signal complies with a preset position, the antenna position referring to the position of the used MIMO antenna relative to an MIMO antenna array. In an exemplary embodiment, the access network equipment is a macro eNB, and an MIMO antenna array used by the macro eNB is arc-shaped from top to bottom; when the position of the used MIMO antenna relative to the MIMO antenna array is in the top, the macro eNB sends a predetermined instruction to the terminal device.

As another alternative implementation manner, step 802 may be replaced by that: the access network equipment detects whether the antenna number of the MIMO antennas used when receiving the first signal exceeds the preset number, and whether the antenna position complies with the preset position.

Figure 9A:
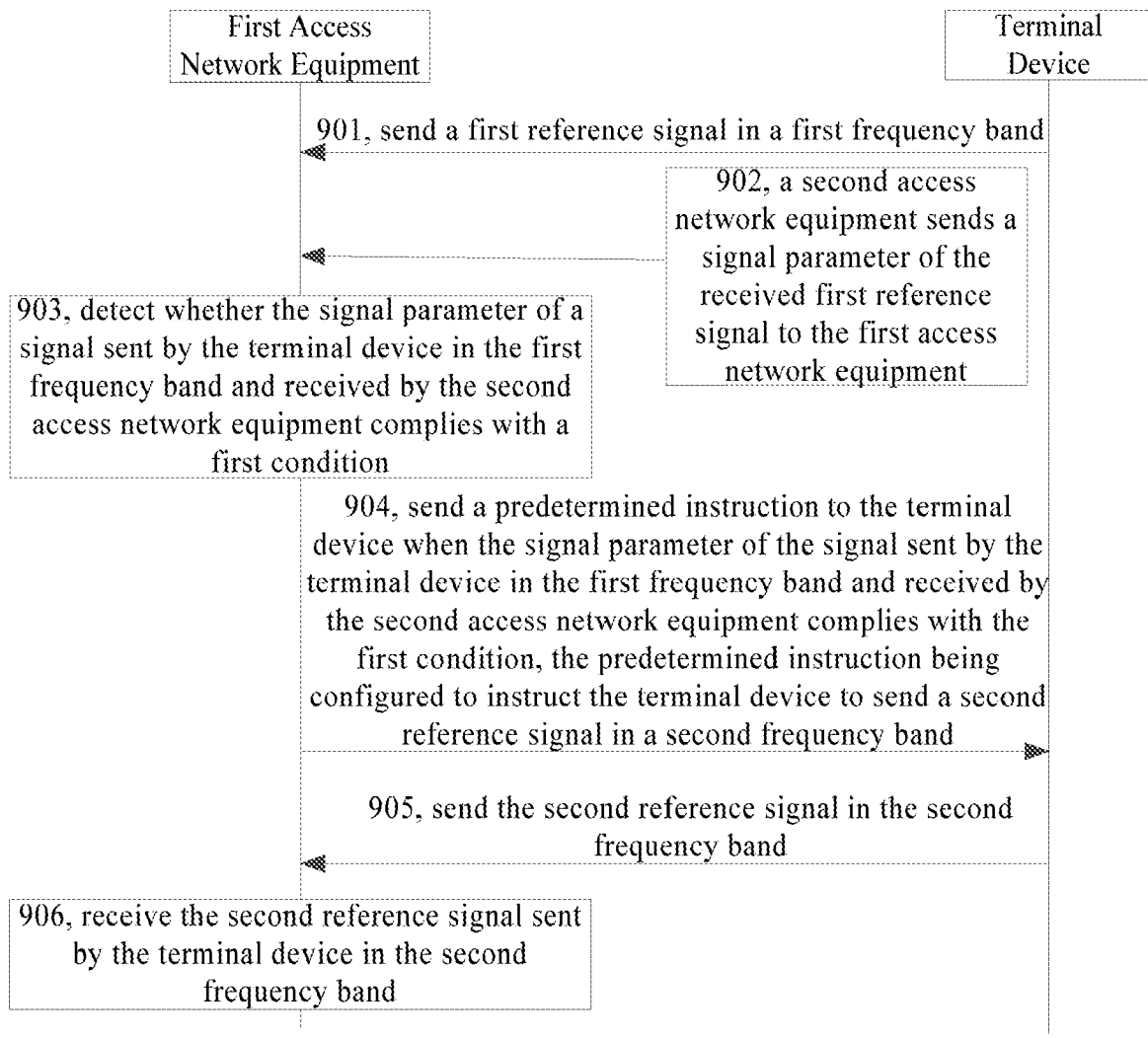
FIG. 9A is a flow chart of a method for sending a reference signal according to some other embodiments.

With respect to the fourth implementation manner of the predetermined condition, FIG. 9A shows a flow chart of a method for sending a reference signal according to some other embodiments. The method for sending a reference signal includes the following steps.

In step 901, a terminal device sends a first reference signal in a first frequency band.

Optionally, the first frequency band belongs to a low frequency band. The first reference signal is a reference signal sent by the terminal device in the first frequency band.

In step 902, a second access network equipment sends a signal parameter of the received first reference signal to a first access network equipment.

Optionally, the first access network equipment is an access network equipment corresponding to a cell where the terminal device is preparing to reside or is residing.

Because the access network devices are intensively distributed in a complicated networking environment, a plurality of access network devices can receive the first reference signal when the terminal device sends the reference signal in the first frequency band. However, because the distances and obstacle numbers of respective access network equipment from the terminal device are different from each other, the signal parameters of respective access network equipment when receiving the first reference signal are different from each other, and these signal parameters may be integrated to predict the position of the terminal device.

Optionally, the signal parameter includes: at least one of a signal intensity, a signal power, a signal quality, or a signal error rate.

Optionally, the second access network equipment directly sends the signal parameter of the received first reference signal to the first access network equipment. Optionally, the second access network equipment sends the signal parameter of the received first reference signal to the first access network equipment through a core network element.

In step 903, the first access network equipment detects whether the signal parameter of a signal sent by the terminal device in the first frequency band and received by the second access network equipment complies with a first condition.

Optionally, at least two second access network devices are arranged, and the first condition is a corresponding condition when the geographical position of the terminal device is in a preset region relative to the geographical positions of the at least two second access network devices.

Figure 9B:
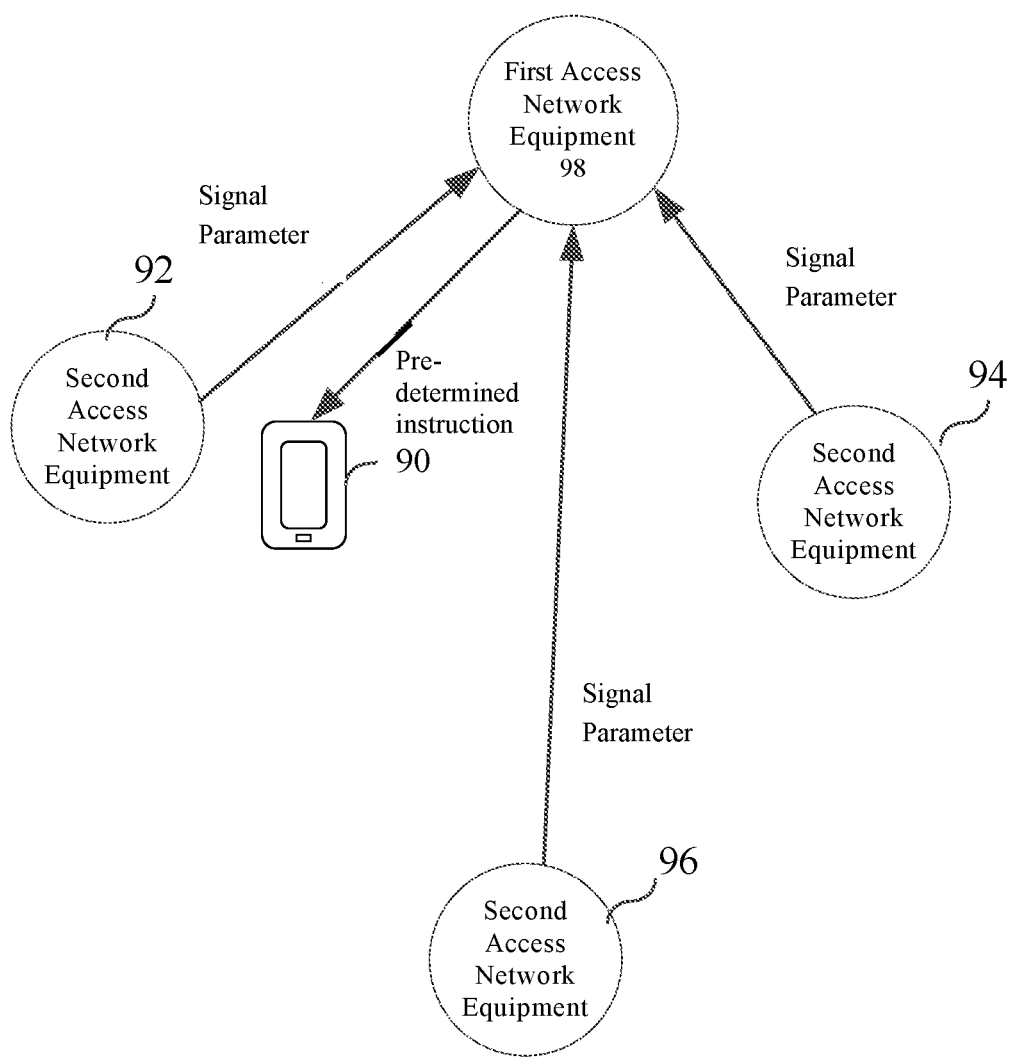
FIG. 9B shows a schematic diagram of the method for sending a reference signal in one implementation provided by the embodiment as shown in FIG. 9A.

Schematically referring to FIG. 9B, three second access network devices are arranged; when a terminal device 90 is located in a second access network equipment 92 close to an upper-left corner among the three second access network devices, a signal intensity of the first reference signal received by the second access network equipment 92 in the upper-left corner is greater than an intensity A; a signal intensity of the first reference signal received by a second access network equipment 94 in the upper-right corner is greater than an intensity B; and a signal intensity of the first reference signal received by a second access network equipment 96 in the lower place is less than the intensity A, but is greater than the intensity B. If a first access network equipment 98 detects that the signal parameters of the first reference signals sent by the terminal device in the first frequency band and received by the three second access network devices comply with the first condition, then the terminal device 90 is likely to be located in a region as shown in FIG. 9B.

If the second access network equipment in the upper-left corner is an access network equipment that supports the second frequency band, then the first access network equipment will trigger the terminal device to send a second reference signal in the second frequency band.

In step 904, the first access network equipment sends a predetermined instruction to the terminal device when the signal parameters of the first reference signals sent by the terminal device in the first frequency band and received by the second access network devices comply with the first condition, the predetermined instruction being configured to instruct the terminal device to send the second reference signal in the second frequency band.

Optionally, the first access network equipment sends the predetermined instruction to the terminal device in the first frequency band.

In step 905, the terminal device sends the second reference signal in the second frequency band.

Optionally, the second frequency band belongs to a high frequency band, and the lower frequency limit of the second frequency band is higher than the upper frequency limit of the first frequency band.

In step 906, the first access network equipment and/or the second access network equipment receives the second reference signal sent by the terminal device in the second frequency band.

Optionally, the first access network equipment and/or the second access network equipment performs channel evaluation or channel state information measurement according to the second reference signal.

Therefore, by instructing the terminal device to send the second reference signal in the second frequency band through the access network equipment when the signal parameter of the signal sent by the terminal device in the first frequency band and received by the second access network equipment complies with the first condition, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and also saving the power consumption needed by the terminal device needed for sending the second reference signal.

As an alternative implementation manner, step 903 may be replaced by that: the first access network equipment detects that the signal parameter of the signal sent by the terminal device in the first frequency band and received by the second access network equipment complies with a second condition, and the signal parameter of the signal sent by the terminal device in the first frequency band and received by the first access network equipment complies with a third condition. That is, the first access network equipment synthesizes the receiving situations thereof and the receiving situations of other access network devices to predict the region where the terminal device locates.

Figure 10:
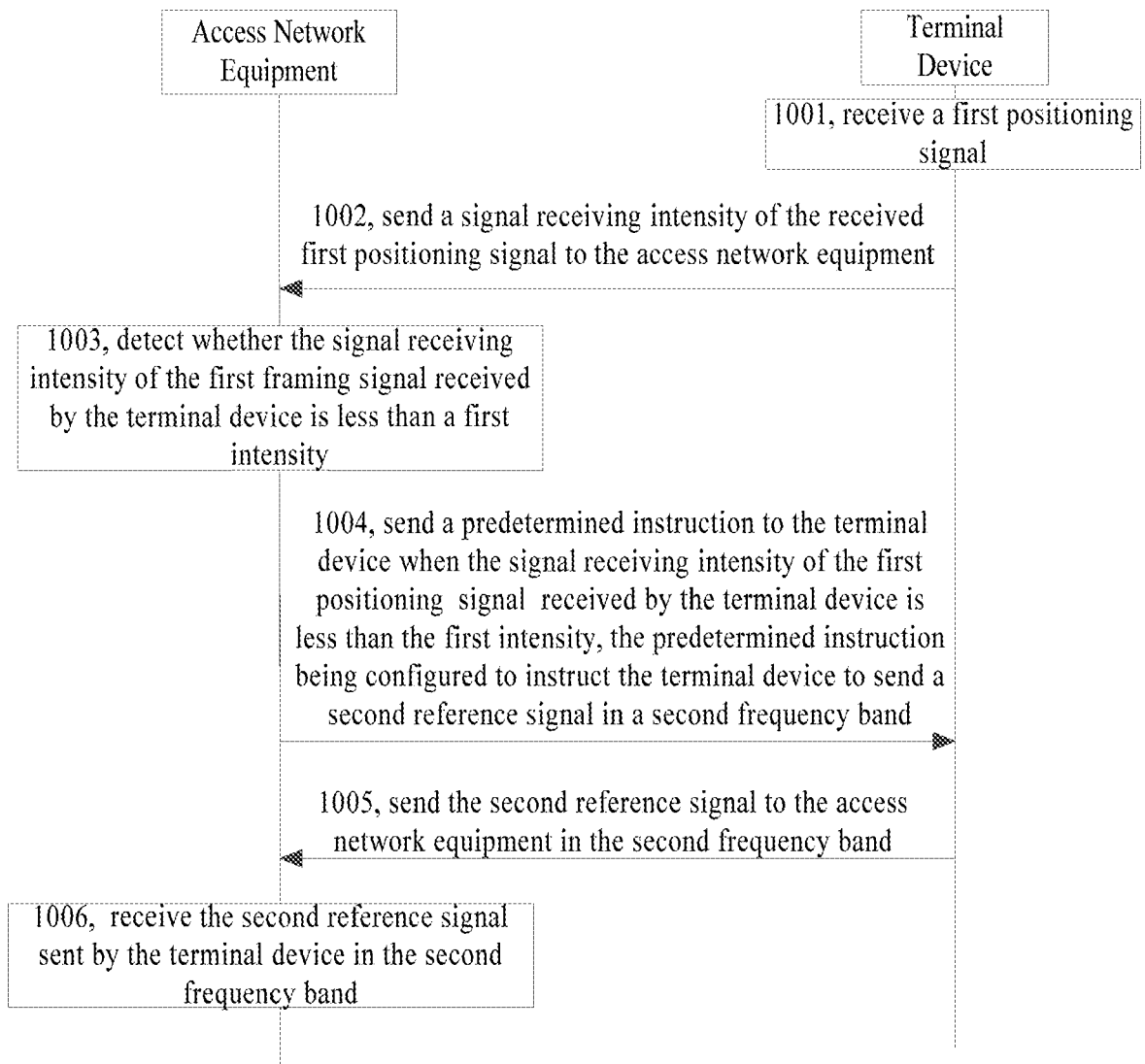
FIG. 10 shows a flow chart of a method for sending a reference signal according to some other embodiments.

With respect to the fifth implementation manner of the predetermined condition, FIG. 10 shows a flow chart of a method for sending a reference signal according to some embodiments. The method for sending a reference signal includes the following steps.

In step 1001, a terminal device receives a first positioning signal.

The first positioning signal is a positioning signal received by the terminal device when using a first frequency band to communicate.

Optionally, the first frequency band belongs to a low frequency band.

In step 1002, the terminal device sends a signal receiving intensity of the received first positioning signal to an access network equipment.

Optionally, the access network equipment is an access network equipment corresponding to a cell where the terminal device is preparing to reside or is residing.

Correspondingly, the access network equipment receives the signal receiving intensity of the first positioning signal sent by the terminal device.

In step 1003, the access network equipment detects whether a signal receiving intensity of the first positioning signal received by the terminal device is less than a first intensity.

The reference signal measurement based on a high frequency band may be greatly applied to indoor environments. In an indoor environment, the signal receiving intensity of the first positioning signal received by the terminal device will be weakened; therefore, the access network equipment detects whether the signal receiving intensity of the first positioning signal received by the terminal device is less than the first intensity, so as to judge whether the terminal device is in an door environment.

If both the terminal device and the access network equipment are in an indoor environment, then it is more to enable a process of sending a reference signal in a high frequency band by the terminal device.

In step 1004, the access network equipment sends a predetermined instruction to the terminal device when the signal receiving intensity of the first positioning signal received by the terminal device is less than the first intensity, the predetermined instruction being configured to instruct the terminal device to send a second reference signal in a second frequency band.

Optionally, the access network equipment sends the predetermined instruction to the terminal device in the first frequency band.

In step 1005, the terminal device sends the second reference signal to the access network equipment in the second frequency band.

Optionally, the second frequency band belongs to a high frequency band, and the lower frequency limit of the second frequency band is higher than the upper frequency limit of the first frequency band.

In step 1006, the access network equipment receives the second reference signal sent by the terminal device in the second frequency band.

Optionally, the access network equipment performs channel evaluation or channel state information measurement according to the second reference signal.

Therefore, by instructing the terminal device to send the second reference signal in the second frequency band through the access network equipment when the signal receiving intensity of the first positioning signal received by the terminal device is less than the first intensity, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and saving the power consumption needed by the terminal device needed for sending the second reference signal.

In an alternative implementation manner, step 1003 may be replaced by that: the access network equipment detects whether the signal receiving intensity of the first positioning signal received by the terminal device is less than the first intensity, and whether a signal receiving intensity of a second positioning signal received by the access network equipment is less than a second intensity.

In another alternative implementation manner, step 1003 may be replaced by that: the access network equipment detects whether the difference between the signal receiving intensity of the first positioning signal received by the terminal device and the signal receiving intensity of the second positioning signal received by the access network equipment is less than a preset difference.

It should be noted that all the foregoing embodiments are illustrated using the access network equipment to detect the predetermined condition and send the predetermined condition to the terminal device according to the detection result. In some embodiments below, the above detecting process of the predetermined condition may be performed by the terminal device.

Figure 11:
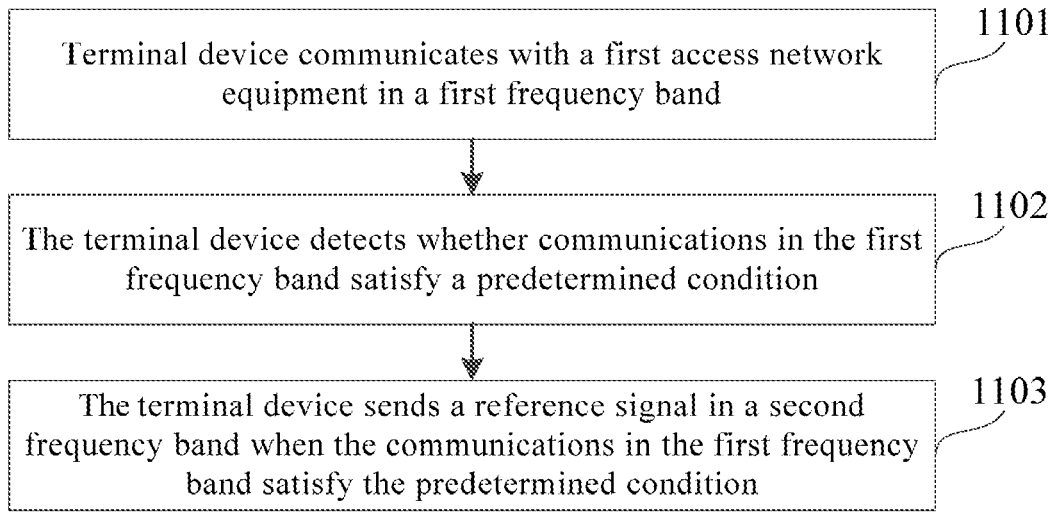
FIG. 11 shows a flow chart of a method for sending a reference signal according to some other embodiments.

FIG. 11 shows a flow chart of a method for sending a reference signal according to some embodiments. The method for sending a reference signal includes the following steps.

In step 1101, a terminal device communicates with a first access network equipment in a first frequency band.

Optionally, the first frequency band belongs to a low frequency band. The "communications" include at least one of the following situations: sending, by the terminal device, a signal to the access network equipment; sending, by the access network equipment, a signal to the terminal device; sending, by the terminal device, a first signal to the access network equipment, and feeding, by the access network equipment, a second signal back to the terminal device based on the first signal; sending, by the access network equipment, a third signal to the terminal device, and feeding, by the terminal device, a fourth signal back to the access network equipment based on the third signal, and the like. Optionally, the signal refers to a reference signal or data, or the like, and the type or particular contents of the signal is not particularly defined in the embodiment of the present disclosure.

In step 1102, the terminal device detects whether communications in the first frequency band satisfy a predetermined condition.

The predetermined condition is a condition used for judging a communication state between the terminal device and the access network equipment. Optionally, when the first frequency band belongs to the low frequency band and the second frequency band belongs to the high frequency band, if the communication state in the first frequency band is better than the predetermined condition, the terminal device is triggered to communicate in the second frequency band.

In step 1103, the terminal device sends a reference signal in a second frequency band when the communications in the first frequency band satisfy the predetermined condition.

Wherein the first frequency band is different from the second frequency band. Optionally, the second frequency band belongs to a high frequency band.

In the embodiments of the present disclosure, the types of uplink reference signals sent by the terminal device are not limited to a demodulation reference signal (DMRS), a sounding reference signal (SRS) and a channel state information reference signal (CSI Reference Signal, CSI-RS); moreover, the terminal device may initiatively send newly added uplink reference signals, and these newly added uplink reference signals have the identical or similar functions as some downlink reference signals in the LTE. For instance, the terminal device is deemed as a "mobile eNB," and the terminal device sends a cell-specific reference signal (CRS). Therefore, the uplink reference signals in the embodiment of the present disclosure refer to any probable reference signal sent by the terminal device, and these reference signals may be used for channel evaluation or channel state measurement, or the like.

Optionally, the access network equipment receives the reference signal sent by the terminal device in the second frequency band, and performs channel evaluation or channel state information measurement on channels in the second frequency band according to the reference signal.

Therefore, by sending the reference signal in the second frequency band through the terminal device when the communications between the terminal device and the access network equipment in the first frequency band satisfy the predetermined condition, the method for sending a reference signal provided by the embodiment solves a problem of lower efficiency for sending the reference signal by the access network equipment when a networking environment is comparatively complicated; and achieves the effects of being not only capable of sending the reference signal by the terminal device, but also selectively sending the reference signal in the second frequency band according to the specific communication situation of the first frequency band, improving the efficiency of the terminal device for sending the reference signal, and reducing the power consumption needed by the terminal device for sending the reference signal in the second frequency band.

Optionally, "communicating in the first frequency band" may be deemed as using the time-frequency resource that belongs to the first frequency band to communicate; Optionally, "sending the reference signal in the second frequency band" may be deemed as using the time-frequency resource that belongs to the second frequency band to communicate.

In a first implementation manner, the predetermined condition includes at least one of the following conditions:

a signal intensity of a second signal being greater than a preset intensity;

a receiving power of the second signal being greater than a preset power;

a receiving quality of the second signal being greater than a preset quality; and an error rate of the second signal being less than a preset value;

wherein the second signal is a signal sent by the first access network equipment in the first frequency band.

In a second implementation manner, the predetermined condition includes:

a distance between a first geographical position of the terminal device when using the first frequency band to communicate and a second geographical position of a predetermined access network equipment being less than a preset threshold;

or, the first geographical position of the terminal device when using the first frequency band to communicate belonging to a predetermined region, and the predetermined region being a region determined according to the predetermined access network equipment;

wherein the predetermined access network equipment is an access network equipment that supports the second frequency band.

In a third implementation manner, the predetermined condition includes:

an antenna number of multiple-input multiple-output MIMO antennas used by the terminal device when sending a signal in the first frequency band exceeding a preset number;

or, an antenna position of the MIMO antenna used by the terminal device when sending the signal in the first frequency band complying with a preset position;

or, the antenna number of the MIMO antennas used by the terminal device when sending the signal in the first frequency band exceeding the preset number, and the antenna position complying with a preset position;

wherein the antenna position refers to a position of the used MIMO antenna relative to an MIMO antenna array.

In a fourth implementation manner, the predetermined condition includes:

a signal receiving intensity of the first positioning signal received by the terminal device being less than a first intensity;

or, the signal receiving intensity of the first positioning signal received by the terminal device being less than the first intensity, and a signal receiving intensity of a second positioning signal received by a first access network equipment being less than a second intensity;

or, a difference between the signal receiving intensity of the first positioning signal received by the terminal device and the signal receiving intensity of a second positioning signal received by the first access network equipment being less than a preset difference;

wherein the first positioning signal is a positioning signal received by the terminal device when using the first frequency band to communicate.

Figure 12:
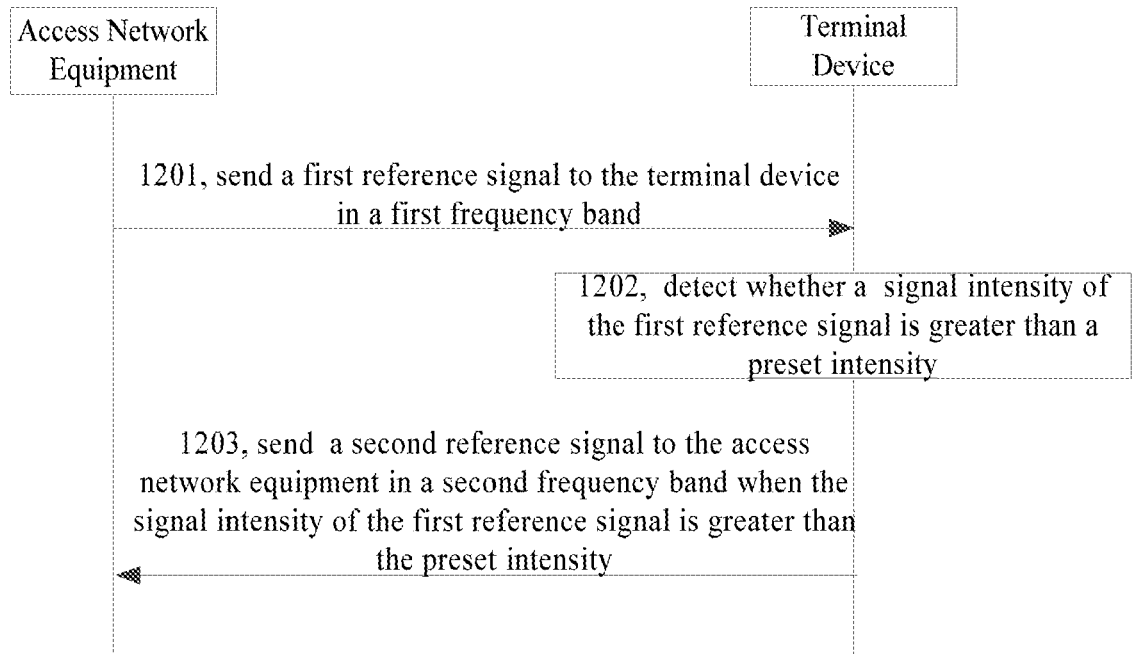
FIG. 12 shows a flow chart of a method for sending a reference signal according to some other embodiments.

With respect to the first implementation manner of the predetermined condition, FIG. 12 shows a flow chart of a method for sending a reference signal according to some embodiments. The embodiment of the present disclosure is illustrated by using a second signal as a second reference signal. The method for sending a reference signal includes the following steps.

In step 1201, an access network equipment sends a first reference signal to a terminal device in a first frequency band.

Optionally, the first frequency band belongs to a low frequency band.

In step 1202, the terminal device detects whether a signal intensity of the first reference signal is greater than a preset intensity.

In step 1203, the terminal device sends a second reference signal to the access network equipment in a second frequency band when the signal intensity of the first reference signal is greater than the preset intensity.

Optionally, the second frequency band belongs to a high frequency band, and the lower frequency limit of the second frequency band is higher than the upper frequency limit of the first frequency band.

Correspondingly, the access network equipment receives the second reference signal sent by the terminal device in the second frequency band.

Optionally, the access network equipment performs channel evaluation or channel state information measurement according to the second reference signal.

It should be noted that the access network equipment in the embodiment may be an access network equipment corresponding to a cell where the terminal device is preparing to reside or is residing.

Therefore, by deciding to send the second reference signal in the second frequency band by the terminal device itself when the signal intensity of the first reference signal sent in the first frequency band is greater than the preset intensity, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and saving the power consumption needed by the terminal device needed for sending the second reference signal.

As an alternative implementation manner, step 1202 may be alternated as that: the terminal device detects whether a receiving power of the first reference signal (Reference Signal Receiver Power, RSRP) is greater than a preset power; as another alternative implementation manner, step 1202 may be alternated as that: the terminal device detects whether a receiving quality of the first reference signal (Reference Signal Receiver Quality, RSRQ) is greater than a preset quality. As yet another alternative implementation manner, the foregoing first reference signal is replaced by a second signal, wherein the second signal is a signal sent by the access network equipment in the first frequency band, which may either be a downlink reference signal or a data signal, then step 1202 may be replaced by that: the terminal device detects whether an error rate of the second signal is less than a preset value.

Figure 13:
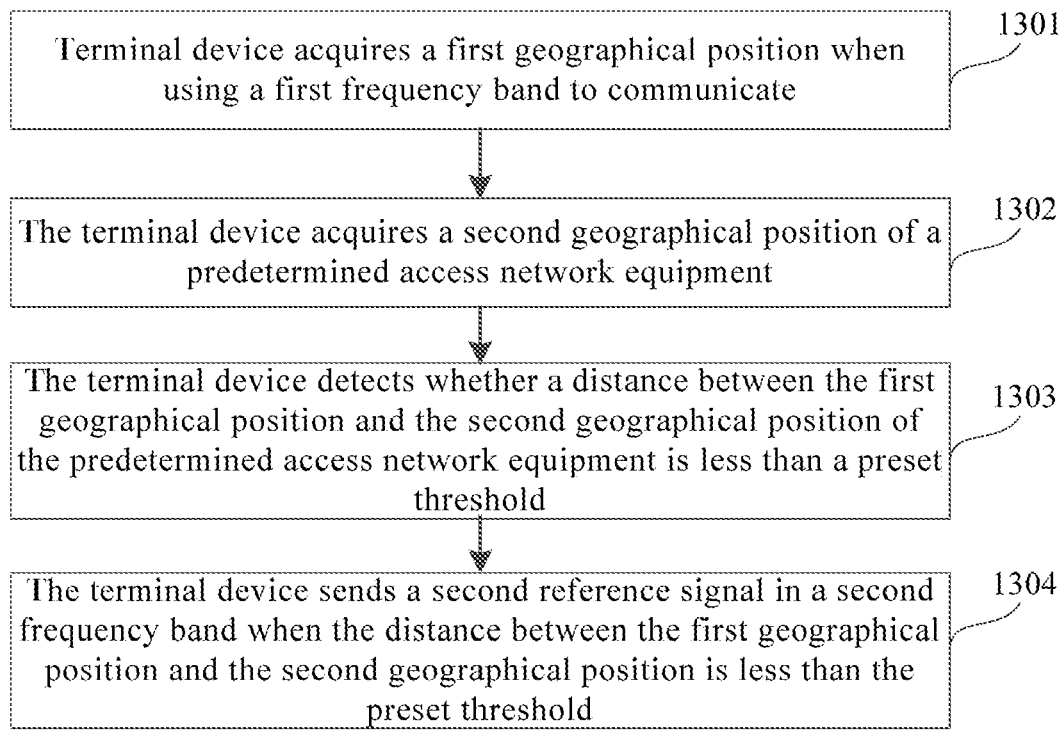
FIG. 13 shows a flow chart of a method for sending a reference signal according to some other embodiments.

With respect to the second implementation manner of the predetermined condition, FIG. 13 shows a flow chart of a method for sending a reference signal according to some other embodiments. The method for sending a reference signal includes the following steps.

In step 1301, a terminal device acquires a first geographical position when using a first frequency band to communicate.

Optionally, the first frequency band belongs to a low frequency band. The terminal device acquires the first geographical position thereof while using the first frequency band to communicate with an access network equipment.

Optionally, the terminal device acquires the first geographical position thereof through a global positioning system (GPS). The positioning modes are not defined in the embodiment. The geographical position may also be positioned through a Beidou system, a wireless access point, or the like.

In step 1302, the terminal device acquires a second geographical position of a predetermined access network equipment.

Optionally, the terminal device pre-stores the second geographical position of the predetermined access network equipment, and the second geographical position of each access network equipment is invariant usually.

Optionally, the terminal device uses the first frequency band to send a geographical position inquiring request to the predetermined access network equipment, and receives the second geographical position fed back by the access network equipment.

Optionally, the sending mode of step 1302 is not defined in the embodiment. If the terminal device acquires the second geographical position of the predetermined access network equipment through another route, then it may be used as an equivalent alternative implementation manner of step 1302.

In step 1303, the terminal device detects whether the distance between the first geographical position and the second geographical position of the predetermined access network equipment is less than a preset threshold.

The predetermined access network equipment is an access network equipment that supports the second frequency band. The predetermined access network equipment may either be an access network equipment that the terminal device is residing in or communicated with currently, or be other access network equipment different from the access network equipment that the terminal device is residing in or communicated with currently.

In step 1304, the terminal device sends a second reference signal in the second frequency band when the distance between the first geographical position and the second geographical position is less than the preset threshold.

Optionally, the second frequency band belongs to a high frequency band, and the lower frequency limit of the second frequency band is higher than the upper frequency limit of the first frequency band.

Correspondingly, the predetermined access network equipment receives the second reference signal sent by the terminal device in the second frequency band.

Optionally, the predetermined access network equipment performs channel evaluation or channel state information measurement according to the second reference signal.

Therefore, by deciding to send the second reference signal in the second frequency band by the terminal device itself when the distance between the first geographical position of the terminal device and the second geographical position of the access network equipment is less than the preset threshold, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and also saving the power consumption needed by the terminal device needed for sending the second reference signal.

As an alternative implementation manner, step 1303 may be alternated as that: the terminal device detects whether the first geographical position when using the first frequency band to communicate belongs to a predetermined region, the predetermined region being a region determined according to the predetermined access network equipment. Usually, the predetermined region is a region determined by taking the predetermined access network equipment as a center, and the predetermined region may also be designed into an irregular region, or a region corresponding to an indoor layout. Therefore, an effect of triggering to send the uplink reference signal in the second frequency band is implemented when the terminal device is indoors.

Figure 14:
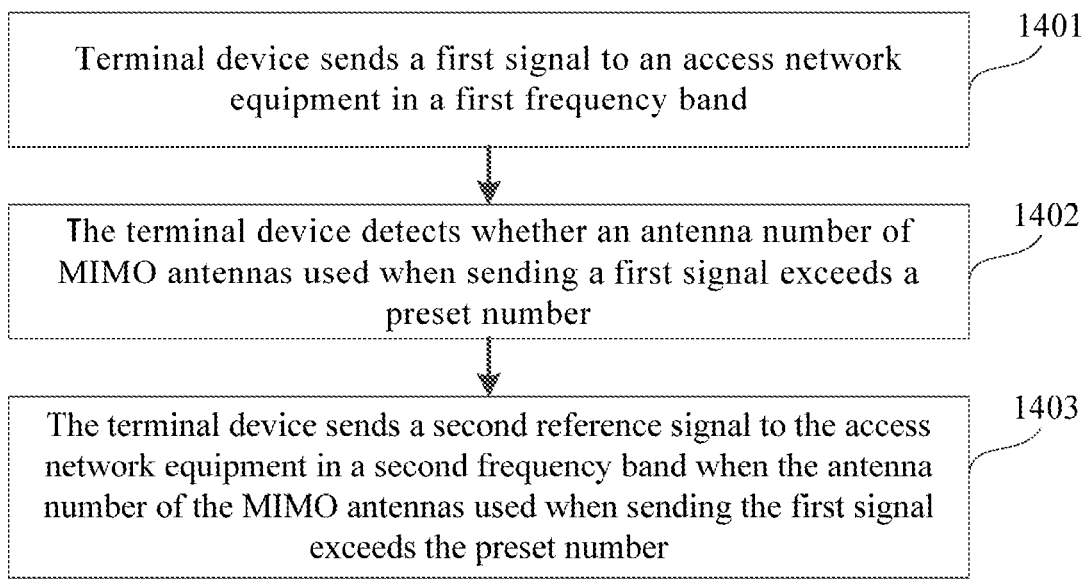
FIG. 14 shows a flow chart of a method for sending a reference signal according to some other embodiments.

With respect to the third implementation manner of the predetermined condition, FIG. 14 shows a flow chart of a method for sending a reference signal according to some other embodiments. The method for sending a reference signal includes the following steps.

In step 1401, a terminal device sends a first signal to an access network equipment in a first frequency band.

Optionally, the first frequency band belongs to a low frequency band. The first signal is a signal sent by the terminal device in the first frequency band.

In step 1402, the terminal device detects whether the antenna number of MIMO antennas used when sending the first signal exceeds a preset number.

For instance, the total number of the MIMO antennas of the terminal device is 32, and the preset number is 20, then the terminal device detects whether the antenna number of the MIMO antennas used when sending the first signal exceeds 20.

In step 1403, the terminal device sends a second reference signal to the access network equipment in a second frequency band when the antenna number of the MIMO antennas used when sending the first signal exceeds the preset number.

Optionally, the second frequency band belongs to a high frequency band, and the lower frequency limit of the second frequency band is higher than the upper frequency limit of the first frequency band.

Correspondingly, the access network equipment receives the second reference signal sent by the terminal device in the second frequency band.

Optionally, the access network equipment performs channel evaluation or channel state information measurement according to the second reference signal.

It should be noted that the access network equipment in the embodiment may be an access network equipment corresponding to a cell where the terminal device is preparing to reside or is residing.

Therefore, by deciding to send the second reference signal in the second frequency band by the terminal device itself when the number of the used MIMO antennas is greater than the preset number, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and saving the power consumption needed by the terminal device needed for sending the second reference signal.

As an alternative implementation manner, step 1402 may be alternated as that: the terminal device detects whether the antenna position of the MIMO antenna used when receiving the first signal complies with a preset position, the antenna position referring to the position of the MIMO antenna used relative to an MIMO antenna array. As another alternative implementation manner, step 1402 may be alternated as that: the terminal device detects whether the antenna number of the MIMO antennas used when sending the first signal exceeds the preset number, and whether the antenna position complies with a preset position.

Figure 15:
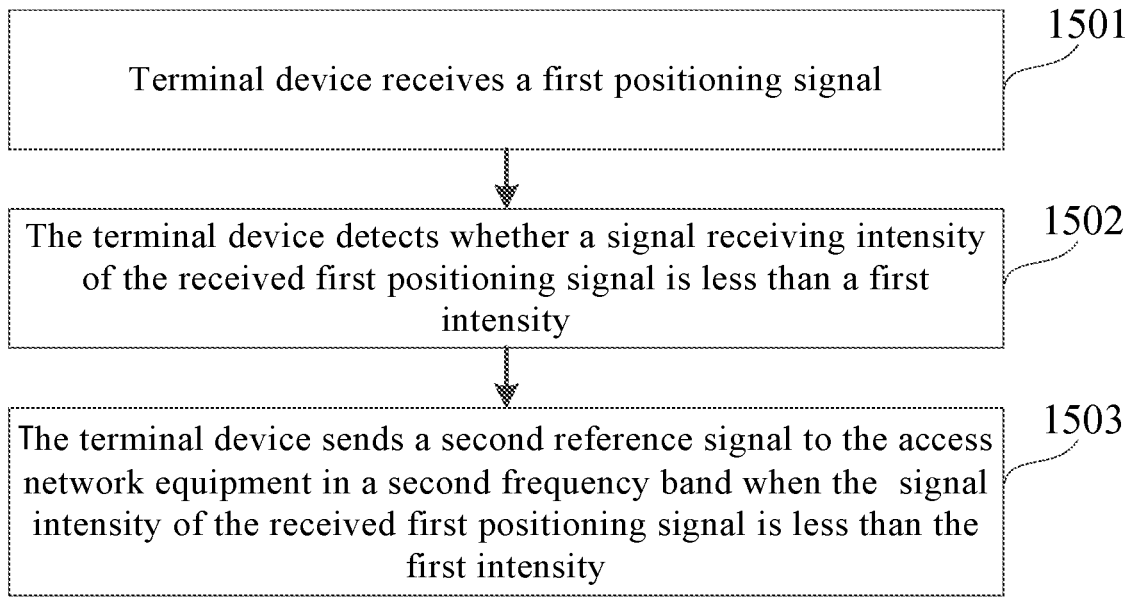
FIG. 15 shows a flow chart of a method for sending a reference signal according to some other embodiments.

With respect to the fourth implementation manner of the predetermined condition, FIG. 15 shows a flow chart of a method for sending a reference signal according to some embodiments. The method for sending a reference signal includes the following steps.

In step 1501, a terminal device receives a first positioning signal.

The first positioning signal is a positioning signal received by the terminal device when using a first frequency band to communicate.

Optionally, the first frequency band belongs to a low frequency band.

In step 1502, the terminal device detects whether a signal receiving intensity of the received first positioning signal is less than a first intensity.

The reference signal measurement based on a high frequency band will be largely applied to indoor environments; in an indoor environment, the signal receiving intensity of the first positioning signal received by the terminal device will be weakened; therefore, the access network equipment detects whether the signal receiving intensity of the first positioning signal received by the terminal device is less than the first intensity, so as to judge whether the terminal device is in an door environment.

If both the terminal device and the access network equipment are in an indoor environment, then it is more probable to enable a process of sending a reference signal in a high frequency band by the terminal device.

In step 1503, the terminal device sends a second reference signal to the access network equipment in a second frequency band when the signal receiving intensity of the received first positioning signal intensity is less than the first intensity.

Optionally, the second frequency band belongs to a high frequency band, and the lower frequency limit of the second frequency band is higher than the upper frequency limit of the first frequency band.

Correspondingly, the access network equipment receives a second reference signal sent by the terminal device in a second frequency band.

Optionally, the access network equipment performs channel evaluation or channel state information measurement according to the second reference signal.

Therefore, by deciding to send the second reference signal in the second frequency band by the terminal device itself when the signal receiving intensity of the first positioning signal received by the terminal device is less than the first intensity, the method for sending a reference signal provided by the embodiment enables the terminal device not need to send the second reference signal in the second frequency band all the time, but selectively send the second reference signal in the second frequency band when the communication state of the first frequency band is better than the predetermined condition, thus improving the efficiency of the terminal device for sending the second frequency band, and saving the power consumption needed by the terminal device needed for sending the second reference signal.

In an alternative implementation manner, the terminal device can acquire a signal receiving intensity of a second positioning signal of the access network equipment, and step 1502 is alternated as that: the terminal device detects whether the signal receiving intensity of the received first positioning signal is less than the first intensity, and whether the signal receiving intensity of the second positioning signal received by the access network equipment is less than a second intensity.

Or, in another alternative implementation manner, step 1502 may be alternated as that: the terminal device detects whether the difference between the signal receiving intensity of the received first positioning signal and the signal receiving intensity of a second positioning signal received by the access network equipment is less than a preset difference.

One point to be noted is that every two or a plurality of the above embodiments may also be combined to constitute new embodiments. For example, the predetermined condition includes: the distance between the first geographical position of the terminal device and the second geographical position of the access network equipment being less than the preset distance, and the signal intensity of the first positioning signal received by the terminal device being less than the first intensity. Such contents easily thought by those skilled in the art according to the foregoing embodiments and illustrations will not be elaborated one by one.

Another point to be noted is that if an antenna and/or power amplifier module on the terminal device corresponding to the second frequency band is independent, then the terminal device may activate the antenna and/or power amplifier module corresponding to the second frequency band into a working state when receiving the predetermined instruction or independently judging that the predetermined condition is satisfied.

Still another point to be noted is that steps in the various method embodiments associated with the terminal device may be performed by one or more program located in a memory accessible by a processor (communication chip) in the terminal device as shown in FIG. 3; and steps in the various method embodiments associated with the access network equipment may be performed by one or more program located in a memory accessible by a processor in the access network equipment as shown in FIG. 2.

Figure 16:
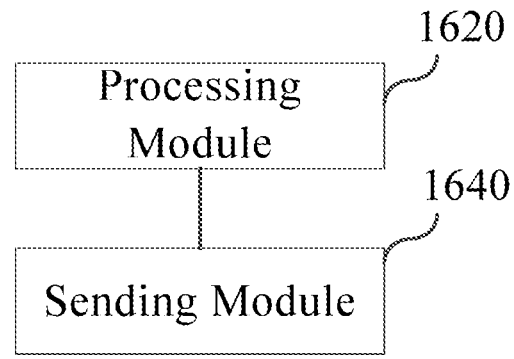
FIG. 16 shows a block diagram of an apparatus for sending a reference signal according to some embodiments.

FIG. 16 shows a block diagram of an apparatus for sending signaling according to some embodiments. The apparatus for sending signaling may achieve a whole or a part of the access network equipment through a dedicated hardware circuit, or a combination of hardware and software. The apparatus for sending signaling includes:

a processing module 1620 configured to detect whether communications of a terminal device in a first frequency band satisfy a predetermined condition; and a sending module 1640 configured to send predetermined signaling to the terminal device when the communications in the first frequency band satisfy the predetermined condition, the predetermined signaling being configured to instruct the terminal device to send a reference signal in a second frequency band;

wherein the first frequency band is different from the second frequency band.

Optionally, the predetermined condition includes at least one of the following conditions: a signal intensity of a first signal being greater than a preset intensity; a receiving power of the first signal being greater than a preset power; a receiving quality of the first signal being greater than a preset quality; and a error rate of the first signal being less than a preset value; wherein the first signal is a signal sent by the terminal device in the first frequency band.

Optionally, the predetermined condition includes: the distance between a first geographical position of the terminal device when using the first frequency band to communicate and a second geographical position of a predetermined access network equipment being less than a preset threshold; or, the first geographical position of the terminal device when using the first frequency band to communicate belonging to a predetermined region, and the predetermined region being a region determined according to the predetermined access network equipment;

wherein the predetermined access network equipment is an access network equipment that supports the second frequency band.

Optionally, the predetermined condition includes: the antenna number of multiple-input multiple-output MIMO antennas used when receiving the first signal exceeding a preset number; or, the antenna position of the MIMO antennas used when receiving the first signal complying with a preset position; or, the antenna number of the MIMO antennas used when receiving the first signal exceeding the preset number, and the antenna position complying with the preset position; wherein the first signal is a signal send by the terminal device in the first frequency band, and the antenna position refers to the position of the MIMO antennas used relative to an MIMO antenna array.

Optionally, the predetermined condition includes: the signal parameter of a signal sent by the terminal device in the first frequency band and received by a second access network equipment complying with a first condition; or, the signal parameter of the signal sent by the terminal device in the first frequency band and received by the second access network equipment complying with a second condition, and the signal parameter of a signal sent by the terminal device in the first frequency band and received by the apparatus for sending signaling complying with a third condition; wherein the signal parameter includes: at least one of a signal intensity, a signal power, a signal quality, and a signal error rate.

Optionally, the predetermined condition includes: a signal receiving intensity of a first positioning signal received by the terminal device being less than a first intensity; or, the signal receiving intensity of a first positioning signal received by the terminal device being less than the first intensity, and a signal receiving intensity of a second positioning signal received by the apparatus for sending signaling being less than a second intensity;

or, a difference between a signal receiving intensity of a first positioning signal received by the terminal device and a signal receiving intensity of a second positioning signal received by the apparatus for sending signaling being less than a preset difference; wherein the first positioning signal is a positioning signal received by the terminal device when using the first frequency band to communicate.

Optionally, an upper frequency limit of the first frequency band is less than a lower frequency limit of the second frequency band.

Optionally, the number of the second frequency band is n, and each of the second frequency band is corresponding to the predetermined condition thereof.

Optionally, the reference signal includes at least one of the following reference signals: a specific reference signal for the terminal device, a DMRS, an SRS, and a CSI-RS.

Figure 17:
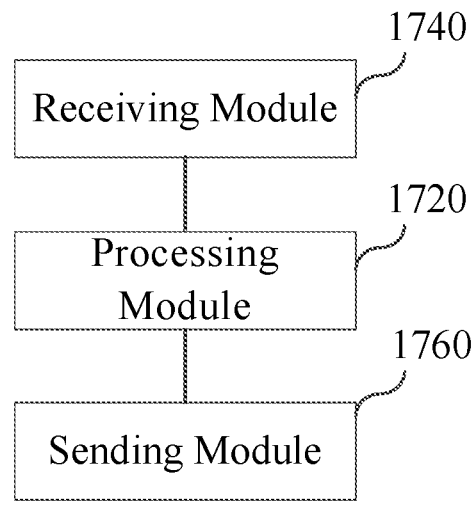
FIG. 17 shows a block diagram of an apparatus for sending a reference signal according to some embodiments.

FIG. 17 shows a block diagram of an apparatus for sending a reference signal according to some embodiments. The apparatus for sending a reference signal may achieve a whole or a part of a terminal device through a dedicated hardware circuit, or a combination of hardware and software. The apparatus for sending a reference signal includes:

a processing portion 1720 configured to communicate with an access network equipment in a first frequency band;

a receiving portion 1740 configured to receive a predetermined instruction sent by the access network equipment, the predetermined instruction being sent by the access network equipment when communications in the first frequency band satisfy a predetermined condition; and a sending portion 1760 configured to send a reference signal in a second frequency band;

wherein the first frequency band is different from the second frequency band.

Optionally, an upper frequency limit of the first frequency band is less than a lower frequency limit of the second frequency band.

Optionally, the number of the second frequency band is n, and each of the second frequency band is corresponding to the predetermined condition thereof.

Optionally, the reference signal includes at least one of the following reference signals:

a specific reference signal for the terminal device, a DMRS, an SRS, and a CSI-RS.

Figure 18:
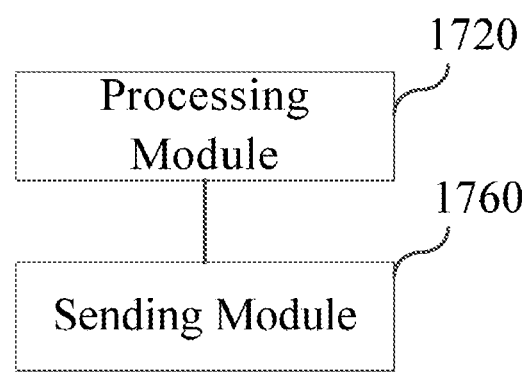
FIG. 18 shows a block diagram of an apparatus for sending a reference signal according to some embodiments.

FIG. 18 shows a block diagram of an apparatus for sending a reference signal according to some embodiments. The apparatus for sending a reference signal may achieve a whole or a part of a terminal device through a dedicated hardware circuit, or a combination of hardware and software. The apparatus for sending a reference signal includes:

a processing portion 1720 configured to communicate with a first access network equipment in a first frequency band;

the processing portion 1720 being configured to detect whether communications of a terminal device in a first frequency band satisfy a predetermined condition; and a sending portion 1760 configured to send a reference signal in a second frequency band when the communications in the first frequency band satisfy the predetermined condition;

wherein the first frequency band is different from the second frequency band.

Optionally, the predetermined condition includes at least one of the following conditions: a signal intensity of a second signal being greater than a preset intensity; a receiving power of the second signal being greater than a preset power; a receiving quality of the second signal being greater than a preset quality; and an error rate of the second signal being less than a preset value; wherein the second signal is a signal sent by the first access network equipment in the first frequency band.

Optionally, the predetermined condition includes: a distance between a first geographical position of the apparatus for sending a reference signal when using the first frequency band to communicate and a second geographical position of a predetermined access network equipment being less than a preset threshold; or, the first geographical position of the apparatus for sending a reference signal when using the first frequency band to communicate belonging to a predetermined region, and the predetermined region being a region determined according to the predetermined access network equipment; wherein the predetermined access network equipment is an access network equipment that supports the second frequency band.

Optionally, the predetermined condition includes: the antenna number of multiple-input multiple-output MIMO antennas used by the apparatus for sending a reference signal when sending a signal in the first frequency band exceeding a preset number; or, the antenna position of the MIMO antennas used by the apparatus for sending a reference signal when sending the signal in the first frequency band complying with a preset position; or, the antenna number of the MIMO antennas used by the apparatus for sending a reference signal when sending the signal in the first frequency band exceeding the preset number, and the antenna position complying with a preset position; wherein the antenna position refers to the position of the MIMO antennas used relative to an MIMO antenna array.

Optionally, the predetermined condition includes: a signal receiving intensity of a first positioning signal received by the apparatus for sending a reference signal being less than a first intensity; or, the signal receiving intensity of a first positioning signal received by the apparatus for sending a reference signal being less than the first intensity, and a signal receiving intensity of a second positioning signal received by the first access network equipment being less than a second intensity; or, the difference between the signal receiving intensity of a first positioning signal received by the apparatus for sending a reference signal and the signal receiving intensity of a second positioning signal received by the first access network equipment being less than a preset difference; wherein the first positioning signal is a positioning signal received by the apparatus for sending a reference signal when using the first frequency band to communicate.

Optionally, an upper frequency limit of the first frequency band is less than a lower frequency limit of the second frequency band.

Optionally, the number of the second frequency band is n, and each of the second frequency band is corresponding to the predetermined condition thereof.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for sending signaling, comprising:
   detecting, with a first access network equipment, whether communications of a terminal device in a first frequency band satisfy a predetermined condition; and
   sending, through the first access network equipment, predetermined signaling to the terminal device when the communications in the first frequency band satisfy the predetermined condition;
   wherein:
   the predetermined signaling is configured to instruct the terminal device to send a reference signal in a second frequency band; and
   the first frequency band is different from the second frequency band,
   and wherein the predetermined condition comprises:
   an antenna number of multiple-input multiple-output (MIMO) antennas used when receiving a first signal exceeding a preset number, and an antenna position of the multiple-input multiple-output MIMO antennas used by the terminal device when sending the signal in the first frequency band complying with a preset position;
   wherein the first signal is a signal sent by the terminal device in the first frequency band, and the antenna position refers to a position of the used MIMO antennas relative to a MIMO antenna array.

2. The method according to claim 1, wherein an upper frequency limit of the first frequency band is less than a lower frequency limit of the second frequency band.

3. The method according to claim 1, wherein the second frequency band comprises a number of n second frequency bands each corresponding to the predetermined condition thereof.

4. The method according to claim 1, wherein the reference signal comprises at least one of the following reference signals:
   a specific reference signal for the terminal device, a demodulation reference signal DMRS, a sounding reference signal SRS, or a channel state information reference signal CSI-RS.

5. A method for sending a reference signal, comprising:
   communicating, through a terminal device, with an access network equipment in a first frequency band;
   receiving, at the terminal device, a predetermined instruction sent by the access network equipment, the predetermined instruction being sent by the access network equipment when communications in the first frequency band satisfy a predetermined condition; and
   sending, by the terminal device, a reference signal in a second frequency band;
   wherein the first frequency band is different from the second frequency band,
   and wherein the predetermined condition comprises:
   an antenna number of multiple-input multiple-output (MIMO) antennas used when receiving a first signal exceeding a preset number, and an antenna position of the multiple-input multiple-output MIMO antennas used by the terminal device when sending the signal in the first frequency band complying with a preset position;
   wherein the first signal is a signal send by the terminal device in the first frequency band, and the antenna position refers to a position of the used MIMO antennas relative to a MIMO antenna array.

6. The method according to claim 5, wherein an upper frequency limit of the first frequency band is less than a lower frequency limit of the second frequency band.

7. The method according to claim 6, wherein the reference signal comprises at least one of the following reference signals:
   a specific reference signal for the terminal device, a demodulation reference signal DMRS, a sounding reference signal SRS, or a channel state information reference signal CSI-RS.

8. A method for sending a reference signal, comprising:
   communicating, through a terminal device, with a first access network equipment in a first frequency band;
   detecting, by the terminal device, whether communications in the first frequency band satisfy a predetermined condition; and
   sending, by the terminal device, a reference signal in a second frequency band when the communications in the first frequency band satisfy the predetermined condition;
   wherein the first frequency band is different from the second frequency band,
   and wherein the predetermined condition comprises:
   an antenna number of multiple-input multiple-output (MIMO) antennas used when receiving a first signal exceeding a preset number, and an antenna position of the multiple-input multiple-output MIMO antennas used by the terminal device when sending the signal in the first frequency band complying with a preset position;
   wherein the first signal is a signal send by the terminal device in the first frequency band, and the antenna position refers to a position of the used MIMO antennas relative to a MIMO antenna array.

* * * * *